United States Patent
Fujimoto et al.

(10) Patent No.: US 8,514,454 B2
(45) Date of Patent: Aug. 20, 2013

(54) IMAGE PROCESSING APPARATUS AND METHOD FOR SELECTING A PROCESSING MODE BASED ON NUMBER OF RELATIVE MOVEMENTS OF A RECORDING HEAD

(75) Inventors: Yasunori Fujimoto, Inagi (JP); Daigoro Kanematsu, Yokohama (JP); Tomokazu Yanai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 909 days.

(21) Appl. No.: 12/335,368

(22) Filed: Dec. 15, 2008

(65) Prior Publication Data
US 2009/0161131 A1  Jun. 25, 2009

(30) Foreign Application Priority Data
Dec. 20, 2007  (JP) ................. 2007-329340

(51) Int. Cl.
*H04N 1/40* (2006.01)
(52) U.S. Cl.
USPC ......... 358/3.01; 358/3.02; 358/3.03; 358/1.9; 358/3.21; 358/3.06; 347/20; 347/66; 347/151; 347/166; 347/174
(58) Field of Classification Search
None
See application file for complete search history.

(56) References Cited

U.S. PATENT DOCUMENTS

| | | | | |
|---|---|---|---|---|
| 4,734,784 A * | 3/1988 | Tanaka | ............................. | 358/2.1 |
| 5,748,794 A * | 5/1998 | Maeda et al. | .................. | 382/251 |
| 6,201,612 B1 * | 3/2001 | Matsushiro et al. | ............. | 358/1.9 |
| 6,511,143 B1 * | 1/2003 | Ishikawa et al. | ................... | 347/9 |
| 6,836,346 B2 * | 12/2004 | Yoshizawa et al. | ............. | 358/1.9 |
| 7,164,503 B2 * | 1/2007 | Kakutani | ..................... | 358/3.03 |
| 7,268,919 B2 * | 9/2007 | Katsuyama | .................. | 358/3.03 |
| 7,633,650 B2 * | 12/2009 | Fukuda | ........................... | 358/2.1 |
| 7,733,531 B2 * | 6/2010 | Takahashi et al. | ........... | 358/3.03 |
| 7,876,961 B2 * | 1/2011 | Miyagi | ......................... | 382/190 |
| 2001/0012113 A1 * | 8/2001 | Yoshizawa et al. | ............. | 358/1.9 |
| 2002/0039192 A1 | 4/2002 | Otsuka et al. | | |
| 2004/0218200 A1 * | 11/2004 | Ebihara | ......................... | 358/1.9 |
| 2004/0257623 A1 * | 12/2004 | Suzuki | ........................ | 358/3.03 |
| 2005/0031203 A1 * | 2/2005 | Fukuda | ......................... | 382/176 |
| 2005/0088700 A1 * | 4/2005 | Aoki et al. | ................... | 358/3.03 |
| 2006/0066909 A1 * | 3/2006 | Yamamoto | ................... | 358/3.13 |
| 2006/0158693 A1 * | 7/2006 | Takahashi et al. | ........... | 358/3.03 |
| 2007/0206228 A1 * | 9/2007 | Miyagi | ......................... | 358/3.21 |
| 2009/0161165 A1 * | 6/2009 | Fujimoto et al. | .............. | 358/2.1 |
| 2011/0128561 A1 * | 6/2011 | Goto et al. | .................... | 358/1.9 |

FOREIGN PATENT DOCUMENTS

| | | |
|---|---|---|
| JP | 2000-103088 | 4/2000 |
| JP | 2006-231736 | 9/2006 |

\* cited by examiner

*Primary Examiner* — Dung Tran
(74) *Attorney, Agent, or Firm* — Canon U.S.A., Inc., IP Division

(57) ABSTRACT

An image processing apparatus is configured to process multivalued image data corresponding to a unit area of a recording medium so as to form an image on the unit area with a plurality of relative movements between a recording head and the recording medium. The apparatus has a selecting unit for selecting either a first processing mode to segment the multivalued image data into a plurality of multivalued image data corresponding to the plurality of relative movements, and then quantize each of the plurality of multivalued image data, or a second processing mode to quantize the multivalued image data into quantized image data, and then segment the quantized image data into a plurality of quantized image data corresponding to the plurality of relative movements. The selecting unit may select either the first processing mode or the second processing mode based on the number of relative movements to the unit area.

20 Claims, 24 Drawing Sheets

FIG. 3A

| 100 | 250 | 80 | 140 | 60 |
|---|---|---|---|---|
| 78 | 180 | 90 | 16 | 40 |
| 144 | 70 | 160 | 120 | 50 |

MULTIPLE VALUES

DISTRIBUTION / DISTRIBUTION

FIG. 3B DATA FOR FIRST SCANNING

MULTIPLE VALUES
| 100 | 250 | 80 | 140 | 60 |
|---|---|---|---|---|
| 78 | 180 | 90 | 16 | 40 |
| 144 | 77 | 160 | 120 | 50 |

×0.55 DATA CONVERSION

FIG. 3C DATA FOR SECOND SCANNING

MULTIPLE VALUES
| 100 | 250 | 80 | 140 | 60 |
|---|---|---|---|---|
| 78 | 180 | 90 | 16 | 40 |
| 144 | 70 | 160 | 120 | 50 |

×0.45 DATA CONVERSION

FIG. 3D

MULTIPLE VALUES
| 55 | 137 | 44 | 77 | 33 |
|---|---|---|---|---|
| 43 | 99 | 49 | 9 | 22 |
| 79 | 39 | 88 | 66 | 28 |

FIG. 3E

MULTIPLE VALUES
| 45 | 113 | 36 | 63 | 27 |
|---|---|---|---|---|
| 35 | 81 | 41 | 7 | 18 |
| 65 | 31 | 72 | 54 | 22 |

FIG. 3F BINARIZATION ( ERROR DIFFUSION MATRIX A )

FIG. 3G BINARIZATION ( ERROR DIFFUSION MATRIX A )

FIG. 3H DATA PRINTED WITH FIRST SCANNING

BINARY
| 0 | 1 | 0 | 1 | 0 |
|---|---|---|---|---|
| 0 | 0 | 0 | 0 | 0 |
| 1 | 0 | 0 | 1 | 0 |

FIG. 3I DATA PRINTED WITH SECOND SCANNING

BINARY
| 0 | 0 | 1 | 0 | 0 |
|---|---|---|---|---|
| 0 | 0 | 0 | 0 | 0 |
| 0 | 0 | 1 | 0 | 0 |

Prior Art

Prior Art

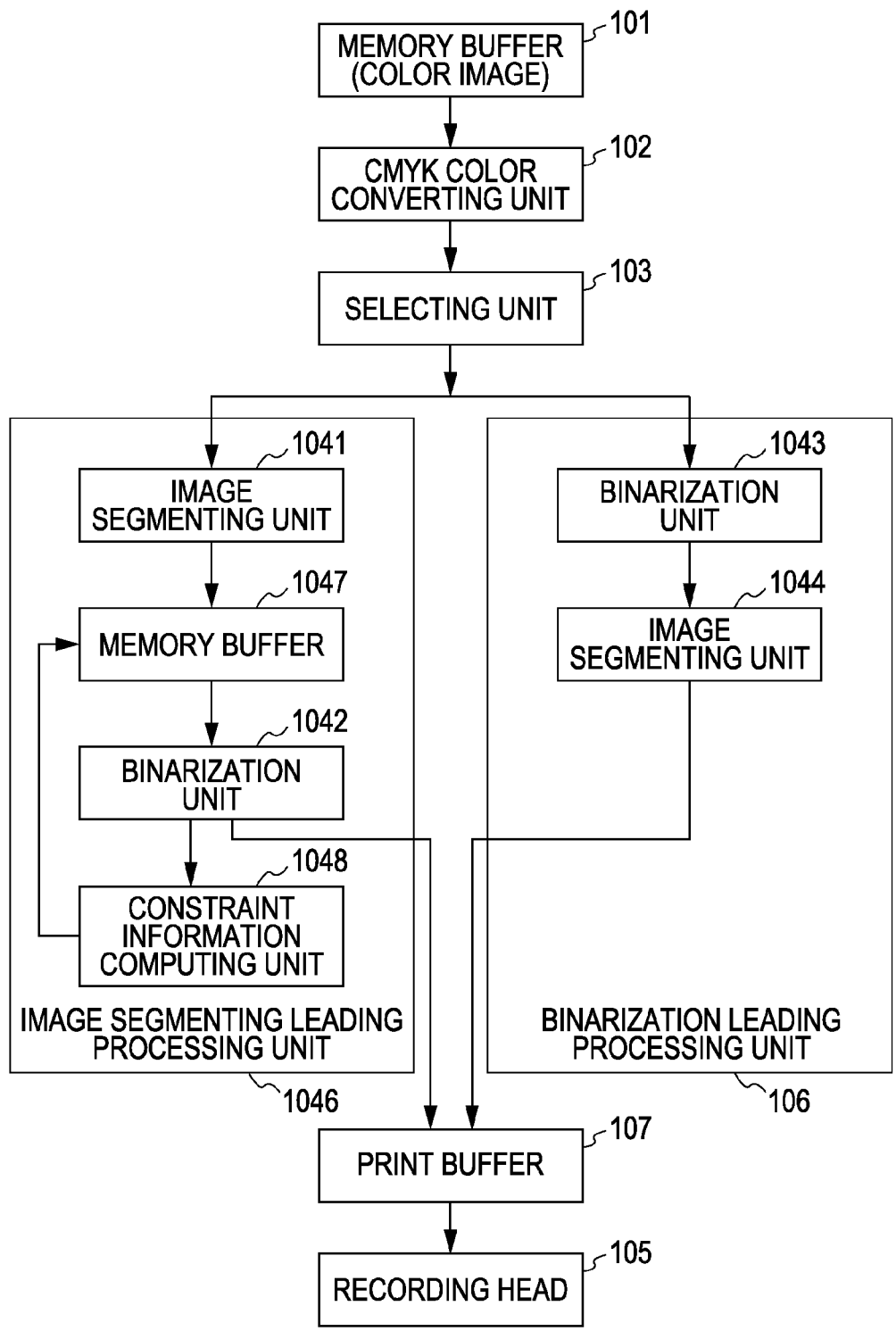

FIG. 11A

| 1/16 | 2/16 | 1/16 |
|---|---|---|
| 2/16 | 4/16 | 2/16 |
| 1/16 | 2/16 | 1/16 |

FIG. 11B

| 16 | 32 | 16 |
|---|---|---|
| 32 | 64 | 32 |
| 16 | 32 | 16 |

FIG. 15
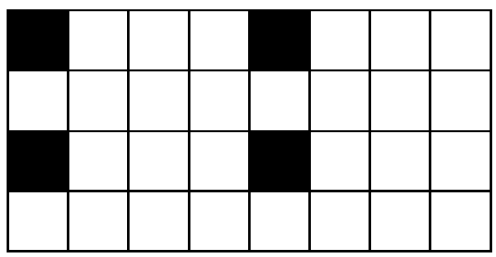 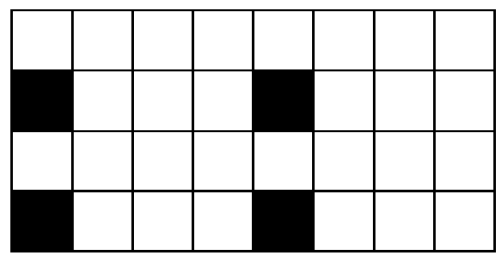
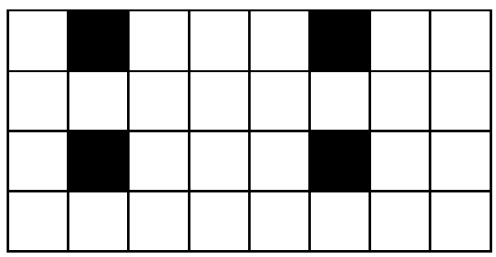 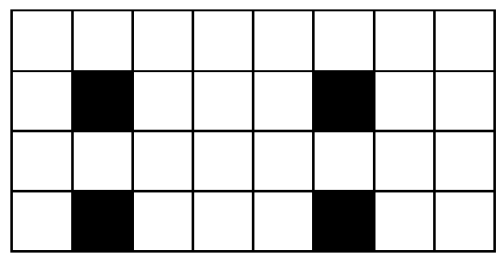
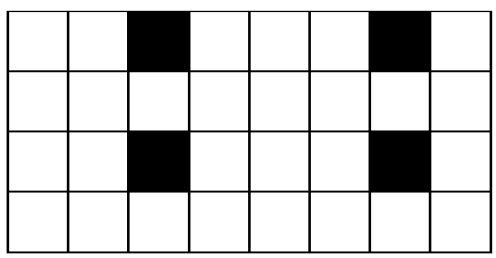 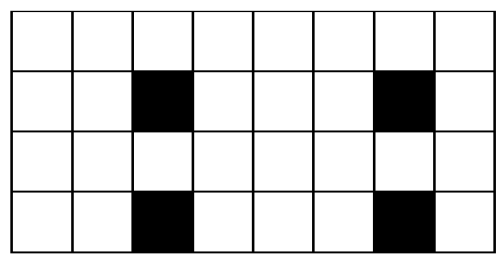
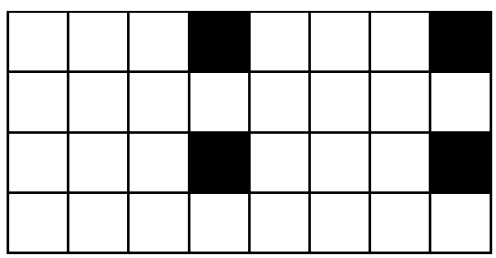 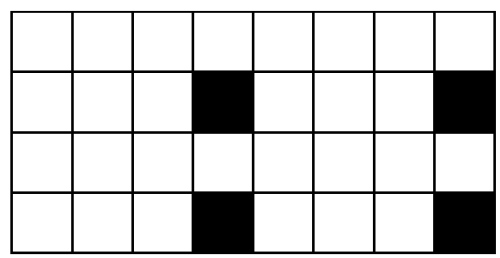

FIG. 18A

|  | * | 9/32 | 3/32 |
|---|---|---|---|
| 5/32 | 9/32 | 3/32 |  |
|  | 3/32 |  |  |

FIG. 18B

|  |  | * | 2/8 | 1/8 |
|---|---|---|---|---|
| 1/8 | 1/8 | 2/8 | 1/8 |  |

IMAGE PROCESSING APPARATUS AND METHOD FOR SELECTING A PROCESSING MODE BASED ON NUMBER OF RELATIVE MOVEMENTS OF A RECORDING HEAD

BACKGROUND OF THE INVENTION

1. Field of the Invention

The present invention generally relates to an image processing apparatus, image forming apparatus, and image processing method to process image data corresponding to increment regions, in order to form an image in increment regions of a recording medium, with a relative movement (relative scanning) performed multiple times between a recording head and a recording medium.

2. Description of the Related Art

As an example of a recording method using a recording head having multiple recording devices, an inkjet recording method that discharges ink from individual recording devices and forms dots on a recording medium has been used. With a serial-type inkjet recording apparatus, an image is formed by repeating recording main scanning, which scans recording heads that discharge ink, and conveying operations that convey the recording medium in a direction orthogonal to the recording main scanning. Such serial-type inkjet recording apparatuses can be manufactured to be relatively small and at relatively low cost, and therefore are widely used for personal use.

With a recording head wherein multiple recording devices are arrayed, discharge amount and discharge direction can be scattered between the recording devices. As a result of this scattering, density unevenness or stripes can occur on the image.

A multi-pass recording method is used as a technique to reduce such image distortions. With the multi-pass recording method, the image data to be recorded in incremental areas of the recording medium are typically segmented into image data corresponding to multiple scans, and by sequentially recording the segmented image data with the multiple scans, with intervening conveying of the recording medium, the image is completed. With such a multi-pass recording method, image distortions resulting from discharge scattering for each recording device can often be reduced. Consequently, an even and smooth image can be obtained. With such a multi-pass recording method, the greater the number of times of the multi-pass, i.e. the number of recording devices used to record one scanning line, the greater the advantages thereof are typically increased. However, for a greater number of multi-passes, the recording speed may become decreased. Thus, a general-use serial-type inkjet recording apparatus is often configured so that multiple recording modes with different numbers of times of multi-passes can be selectively executed.

In the event of performing such multi-pass recording, the image data to be recorded in unit areas may be segmented into image data corresponding to individual recording scans. Heretofore, such data segmenting has often been performed using a mask pattern, wherein recording permitting pixels (1) permitting dot recording, and non-recording permitting pixels (0) not permitting dot recording, are arrayed.

FIG. 13 is a schematic diagram illustrating an example of a mask pattern which can be used with two-pass multi-pass recording. The areas shown in black indicate recording permitting pixels (1) and the areas shown in white indicate non-recording permitting pixels (0). A mask pattern 1801 is used with the first pass recording scanning, and 1802 indicates a mask pattern used with the second pass recording scanning.

Also, the 1801 mask pattern and the 1802 mask pattern may have a mutually supplemental relation.

By performing a logical AND operation between such a mask pattern and binary image data, the binary image data may be segmented into binary image data to be recorded with each recording scan. For example, as shown in FIG. 2, by segmenting the image data showing the dots to be recorded in the unit areas with the mark patterns shown in FIG. 13 (1801, 1802), segmented image data may be generated for both the first pass and the second pass. Thus, with the data segmenting method (mask segmenting method) performed using a mask pattern having a mutually supplemental relation, the binary image data corresponding to the different scans may also have an interpolating relation, whereby the probability that the dots recorded with different scans become overlaid may be relatively low. Therefore, a relatively high density resulting from high dot coverage can be realized, and additionally, favorable granularity can also be secured.

Note that even though such multi-pass recording is employed, there is increasing demand for images with even higher image quality, and density changes or density unevenness resulting from recording scanning increments or shifting in recording position (registration) in recording device array increments can remain. Shifting in the recording positions of the recording scanning increments or recording device array increments may result from fluctuations in the distance between the recording medium and discharge output face (between the paper), fluctuations in conveying amounts of the recording medium, and so forth.

For example, referring to FIG. 2, a case is considered wherein a plane of dots (indicated by single circles) recorded with the leading recording scan, and a plane of dots (indicated by double circles) recorded with the following recording scan, have each shifted by one pixel worth in one of either the main scanning direction or sub scanning direction. In this case, the single-circle dots recorded with the leading recording scan and the double-circle dots recorded with the following recording scan completely overlay one another, whereby an area of white paper is exposed, and image density is decreased. Even if the shift is not as great as an entire pixel worth, if the distance or overlaying amounts between adjacent dots changes, the coverage of dots on the white paper area may fluctuate, and this fluctuation in coverage invites fluctuation in the image density. Such fluctuations in image density may then be recognized as overall density unevenness.

Accordingly, as demand for ever higher quality images increases, a need remains for a processing method for image data at the time of multi-pass recording, which can counter recording position shift between planes that can occur along with fluctuations in various recording conditions. Hereafter, regardless of the reason for the fluctuations and whatever the recording condition, a resistance to density changes and density unevenness that occur from recording position shifts because of such fluctuations is called "robustness" in the present Specification.

Japanese Patent Laid-Open No. 2000-103088 discloses an image data processing method to increase the above-described robustness. According to this document, the fluctuations in image density that occur along with fluctuations in various recording conditions, result from the binary data corresponding to different recording scans being in a mutually complete interpolating relation. As understood from this document, if image data corresponding to different recording scans is generated so that the above supplemental relation is reduced, it is believed that excellent multi-pass recording can be realized. In order to do so, in the Japanese Patent Laid- Open No. 2000-103088, image data is segmented in the state of multivalued data before binarization, and the multivalued data is independently binarized after segmenting. Thereby, even if image data of different planes corresponding to different recording scans shifts with respect to one another, excessively large density fluctuations may not occur.

FIGS. 3A through 3I are diagrams to describe the data segmenting method disclosed in Japanese Patent Laid-Open No. 2000-103088. First, multivalued image data to be recorded in the unit area (see FIG. 3A) is segmented into the multivalued data to be recorded with the first pass (see FIGS. 3B and 3D) and multivalued data to be recorded with the second pass (see FIGS. 3C and 3E). Next, the various multivalued data are individually binarized (see FIGS. 3F and 3G), whereby binary data to be recorded with the first pass (see FIG. 3H) and binary data to be recorded with the second pass (see FIG. 3I) are generated. Lastly, ink is discharged from the recording heads according to the binary data. As shown in FIGS. 3H and 3I, the binary data of the first pass and binary data of the second pass generated as described above are not in a perfectly supplemental relation. Accordingly, there are portions where dots are overlaid (pixels with "1" existing at two planes), and portions where dots are not overlaid (pixels with "1" existing at one plane), between the first pass and the second pass.

FIG. 4 is a diagram showing a state of dots recorded according to the method disclosed in Japanese Patent Laid-Open No. 2000-103088 that are arrayed on the recording medium. In the diagram, a black circle 21 indicates a dot recorded with the first pass, a white circle 22 indicates a dot recorded with the second pass, and a shaded circle 23 indicates a dot recorded by overlaying the first pass and the second pass. In this example, the supplemental relation of the first pass and the second pass are incomplete, thus differing from the case in FIG. 2 wherein the supplemental relation is complete, and thus there are portions wherein two dots overlap and portions wherein dots are not recorded (white sheet area).

As with the case in FIG. 2, a case is considered wherein a dot recorded with the first pass and a dot recorded with the second pass, are shifted one pixel worth in either of the main scanning direction or sub scanning direction. In this case, if there is no position shifting, the dots in the first pass and the dots in the second pass that should not have been overlaid can be overlaid, and the dots 23 that should have been overlaid with no position shifting now are not overlaid. Accordingly, for an area having a certain width, the coverage of dots on the white sheet area does not exhibit as much fluctuation, and image density changes are relatively low. That is to say, with the method in the Japanese Patent Laid-Open No. 2000-103088, even if fluctuations in the distance between the recording medium (e.g., paper) and discharge opening face, and fluctuations in the amount of conveyance of the recording medium occur, accompanying image density fluctuations can be suppressed.

Further, as with Japanese Patent Laid-Open No. 2000-103088, Japanese Patent Laid-Open No. 2006-231736 discloses a technique whereby image data is distributed in multiple recording scans or multiple recording device rows while in the state of multivalued image data, while the distribution rate of such data may be varied based on the image positions. According to this document, the distribution rate can be changed linearly, cyclically, sinusoidally, or in composite waveform of high frequencies and low frequencies, whereby banding and color unevenness with the multi-pass recording method can be suppressed.

However, while the methods in Japanese Patent Laid-Open No. 2000-103088 and Japanese Patent Laid-Open No. 2006-231736 (hereafter referred to, for the sake of convenience, as the "multivalued data segmenting method") are excellent in robustness as compared to the mask segmenting method, in some aspects they may also be inferior to the mask segmenting method. That is to say, the multivalued data segmenting method may tend to have a lower image density because coverage may be lower as compared to the mask segmenting method, and the method may have more of a poor granular feel because overlaying of dots may be high. Also, as the multiple data segmenting method may perform binarizing processing as many times as the multivalued data is segmented, the binarization processing load may be greater as compared to the mask segmenting method.

Thus, while the multiple data segmenting method may be superior to the mask segmenting method in some points, it may also be inferior thereto in other points, and thus multivalued data segmenting method is not uniformly used for all multi-pass modes. That is to say, with a multi-pass mode having different numbers of passes, images subject to main recording and conveyance errors may differ, and thus the time that is consumed for data processing may differ, and also the significance of the existence of the modes may also differ. Accordingly, the data segmenting method may be selected in accordance with the objective or significance of existence of the multi-pass mode. For example, with a mode with only a relatively few numbers of passes, sufficient conveying precision may not capable of being secured, and thus if the apparatus has relatively great density fluctuations according to conveying errors, employing a data segmenting method that is excellent for suppressing density fluctuations that accompany conveying errors for a low-pass mode may be one option. Conversely, in the case where quality of text or line drawings making up the main subject image with a mode having fewer passes is prioritized over robustness, one option may be to employ the mask segmenting method, which is effective for securing text and line drawing quality. In either case, the balance of the overall apparatus may be taken into consideration and the data segmenting method appropriate to the number of times of multi-passes may be selected.

SUMMARY OF THE INVENTION

In one embodiment according to the present invention, an image processing apparatus is provided that is configured to process multivalued image data corresponding to a unit area of a recording medium, so as to form an image on the unit area with a plurality of relative movements between a recording head and the recording medium. The image processing apparatus includes a selecting unit capable of selecting a first processing mode configured to segment the multivalued image data into a plurality of multivalued image data corresponding to the plurality of relative movements, and then quantize each of the plurality of multivalued image data, or a second processing mode configured to quantize the multivalued image data into quantized image data, and then segment the quantized image data into a plurality of quantized image data corresponding to the plurality of relative movements. The selecting unit selects the first processing mode or the second processing mode based on the number of the relative movements to the unit area.

In another embodiment according to the present invention, an image forming apparatus is provided that is configured to form an image on a unit area of a recording medium with a plurality of relative scans between a recording head and a recording medium. The image forming apparatus includes an image processing apparatus as described above, and a driving unit configured to drive the recording head based on image data processed with the image processing apparatus.

In yet another embodiment according to the present invention, an image forming apparatus is provided that is configured to form an image on a unit area of a recording medium with N relative movements between a recording head and the recording medium, with N being an integer of 2 or greater. The image forming apparatus includes a first image processing unit configured to binarize each of N pieces of multivalued image data and generate N pieces of binary image data, after segmenting of the multivalued image data into N pieces of multivalued image data corresponding to N relative movements; a second image processing unit configured to segment the binarized image data into N pieces of binary image data corresponding to N relative movements, after binarizing of the multivalued image data and generating of binarized image data; a selecting unit configured to select the first image processing unit or the second image processing unit based on the value of N; and a driving unit configured to drive the recording head during the N relative movements according to the N pieces of binary image data obtained with the first image processing unit or second image processing unit as selected by the selecting unit.

Further features of the present invention will become apparent from the following description of exemplary embodiments with reference to the attached drawings.

BRIEF DESCRIPTION OF THE DRAWINGS

FIGS. 3A through 3I are diagrams illustrating a specific example of data segmenting processing.

FIG. 10 is a block diagram to describe an embodiment of a process for image processing executed by a recording apparatus according to a third embodiment of the present invention.

FIGS. 11A and 11B are diagrams illustrating embodiments of coefficients used by a constraint information computing unit in the event of filtering computation, and computation results as to binary data for a first plane output from a binarization unit.

FIG. 15 is a schematic diagram illustrating an example of a mask pattern usable with multi-pass recording with eight passes.

FIGS. 18A and 18B are diagrams illustrating an embodiment of an error distributing matrix used in the event of error diffusion processing executed with the binarization unit according to the embodiment of FIG. 5.

DESCRIPTION OF THE EMBODIMENTS

Embodiments of the present invention will be described in detail below with reference to the appended drawings. The embodiments described below exemplify an inkjet recording apparatus, but the present invention is not intended to be limited to only an inkjet recording apparatus. For example, if the apparatus uses a method to record an image on a recording medium with recording heads during relative movement of the recording heads and recording medium to form dots, an apparatus other than an inkjet recording apparatus can also exhibit the advantages thereof, and can be applicable.

The terminology used in the present Specification will be defined. "(N) multi-passes" indicates the number of times of relative movement (relative scanning) between the recording head and the unit area of the recording medium. N may be an integer of 2 or greater, and for example if N=2, a two-pass recording is indicated, and if N=4, a four-pass recording is indicated. In the case of N (N is an integer of 2 or greater)-pass recording, multivalued image data of N planes corresponding to the number of times N of the multi-passes is generated based on the multivalued image data. Each of the N planes of multivalued image data is recorded at each of the N passes.

Also, "unit area" of the recording medium may indicate an area made up with a predetermined number (the predetermined number is an integer of 1 or greater) of pixels. Note that the term "pixel" indicates a region corresponding to a minimum unit that can be performed a gradation expression by the multivalued image data.

Also, "plane" indicates a collection of image data corresponding to the relative movement of the recording head and recording medium, and a different plane corresponds to each different relative movement.

Also, "relative movement" of the recording head and recording medium indicates an operation wherein the recording head moves (scans) relative to the recording medium, or an operation wherein the recording medium moves (conveys) relative to the recording heads. In the case of a serial-type recording apparatus, the former relative movement is executed multiple times with respect to the unit area, thereby performing the above-mentioned multi-pass recording. On the other hand, in the case of a full-line recording apparatus, the latter relative movement is executed multiple times with respect to the unit area, thereby performing the above-mentioned multi-pass recording.

Figure 1:
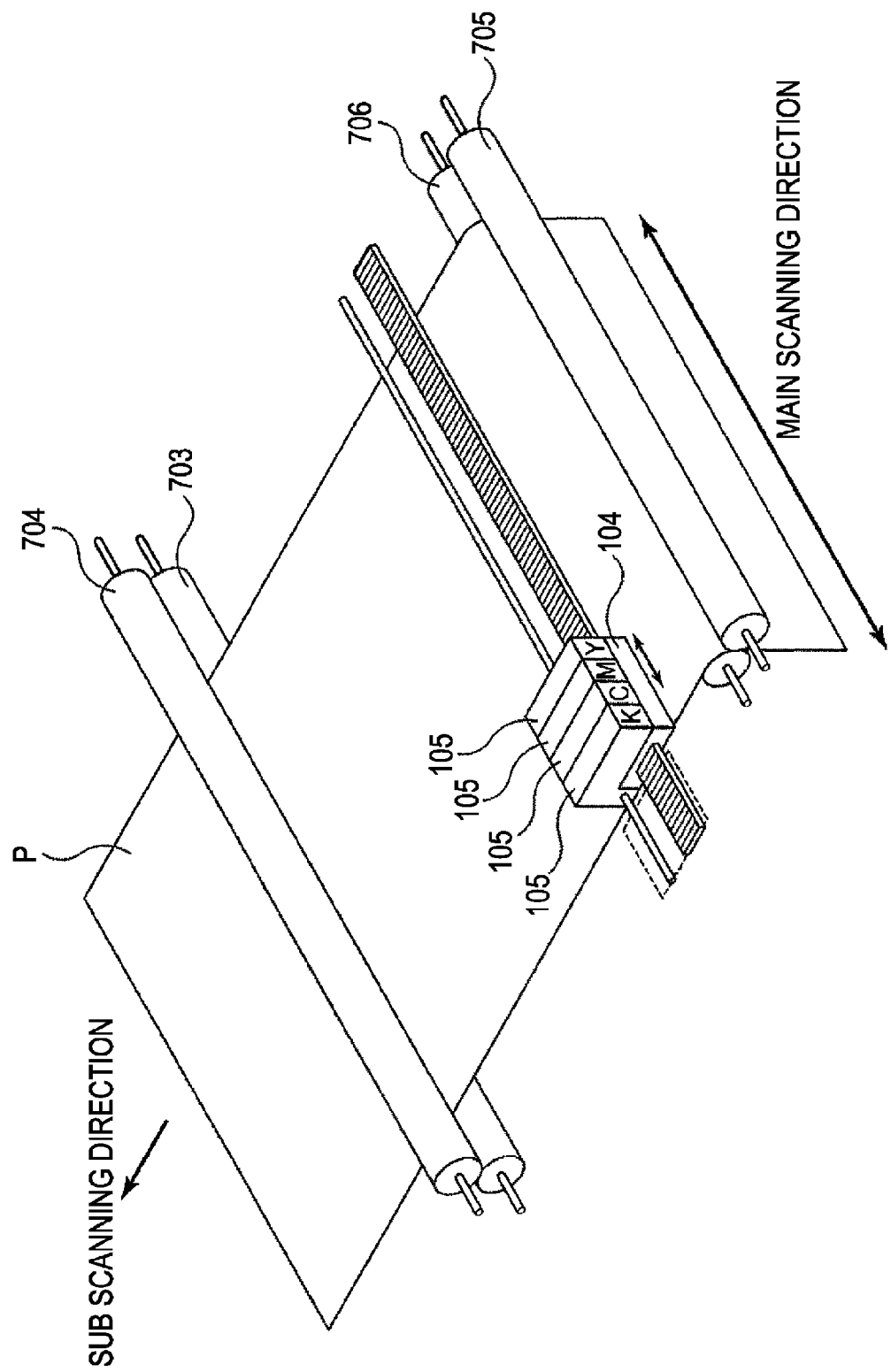
FIG. 1 is a schematic diagram to describe an embodiment of an internal configuration of a serial-type inkjet recording apparatus according to an embodiment of the present invention.

FIG. 1 is a schematic diagram to describe a first embodiment of an internal configuration of a serial-type inkjet recording apparatus. A recording head 105 is mounted on a carriage 104 that moves in the main scanning direction, and discharges ink during movement of the carriage 104. Upon reaching the end of one turn of recording main scanning, a conveying roller 704 and assisting roller 703 are rotated, whereby a recording medium P that is gripped between this roller pair and a paper feed roller 705 and assisting roller 706 is conveyed in the sub scanning direction (conveying direction) indicated by arrows. By repeating such recording main scanning and conveying operations, an image may be recorded in stages on the recording medium P.

The recording heads 105 can include recording heads for black (K), cyan (C), magenta (M), and yellow (Y), and these four color recording heads may be arrayed in parallel in the main scanning direction as shown in the diagram. On each color recording head may be arrayed, in the sub scanning direction, and at a predetermined density, multiple recording devices (nozzles) for discharging ink. Note that with the present example, the number of recording devices arrayed on each color recording head is 1280.

Next, an example of multi-pass recording that can be applied in accordance with the present invention will be described. An example of a two-pass recording is given here as an example of multi-pass recording, but as will be described later, the present invention is not limited to two-pass recording, and an N-pass (where N is an integer of 2 or greater) recording such as 3-pass, 4-pass, 8-pass, or 16-pass, may also be performed.

Figure 21:
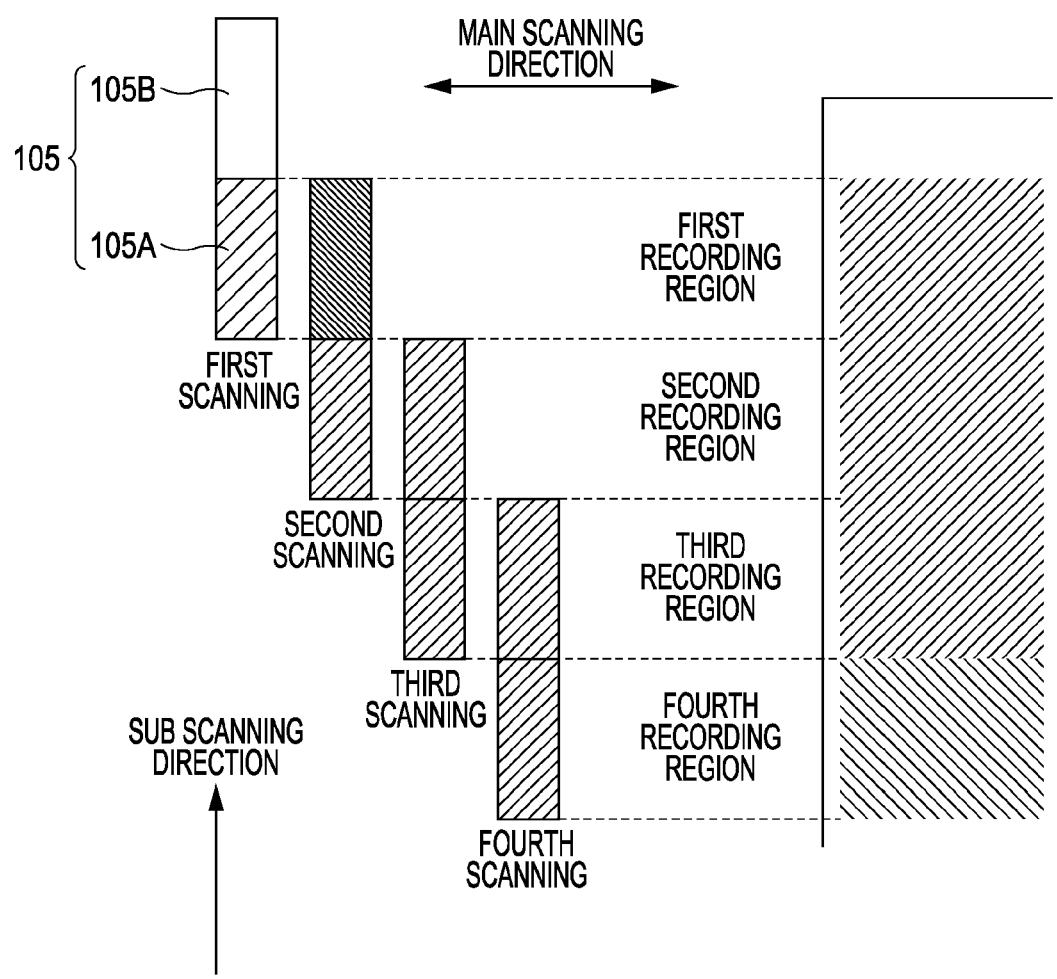
FIG. 21 is diagram illustrating an embodiment of a state of two-pass multi-pass recording.

FIG. 21 is a diagram schematically showing an embodiment of a 2-pass recording situation, and a relative position relation between the recording heads 105 and recording area in the case of recording from a first recording area to a fourth recording area. In FIG. 21, only one color recording head is shown of the four color recording heads 105 shown in FIG. 1. Hereafter, of the multiple recording devices (nozzles) of the recording heads 105, the nozzle group positioned on the conveying direction upstream side will be called the upstream side nozzle group 105A, and the nozzle group positioned on the conveying direction downstream side will be called the downstream side nozzle group 105B. Also, the width in the sub scanning direction (conveying direction) of each recording area is equal to the width (width of 640 nozzles) of approximately half the width of the array range of multiple recording devices of recording heads (width of 1280 nozzles).

According to this embodiment, with the first scan, only a portion of the image to be recorded on the first recording area is recorded using the upstream side nozzle group 105A. Following this, the recording medium is conveyed in the Y direction (the sub scanning direction in FIG. 21) a distance worth 640 nozzles. Next, with the second scan, only a portion of the image to be recorded on the second recording area is recorded using the upstream side nozzle group 105A, while using the downstream side nozzle group 105B to complete the image to be recorded on the first recording region. That is to say, of the image recorded on the first recording region, the portion not recorded with the upstream side nozzle group 105A is supplemented and recorded with the downstream side nozzle group 105B. Following this, the recording medium is conveyed in the Y direction a distance worth 640 nozzles. Next, with the third scan, only a portion of the image to be recorded on the third recording area is recorded using the upstream side nozzle group 105A, while using the downstream side nozzle group 105B to complete the image to be recorded on the second recording region. Following this, the recording medium is conveyed in the Y direction a distance worth 640 nozzles. Lastly, with the fourth scan, only a portion of the image to be recorded on the fourth recording area is recorded using the upstream side nozzle group 105A, while using the downstream side nozzle group 105B to complete the image to be recorded on the third recording region. Following this, the recording medium is conveyed in the Y direction a distance worth 640 nozzles. Similar recording operations may also be performed with respect to the other recording areas. By repeating the above recording main scanning and conveying operations, the image may be completed with 2-pass recording.

Figure 5:
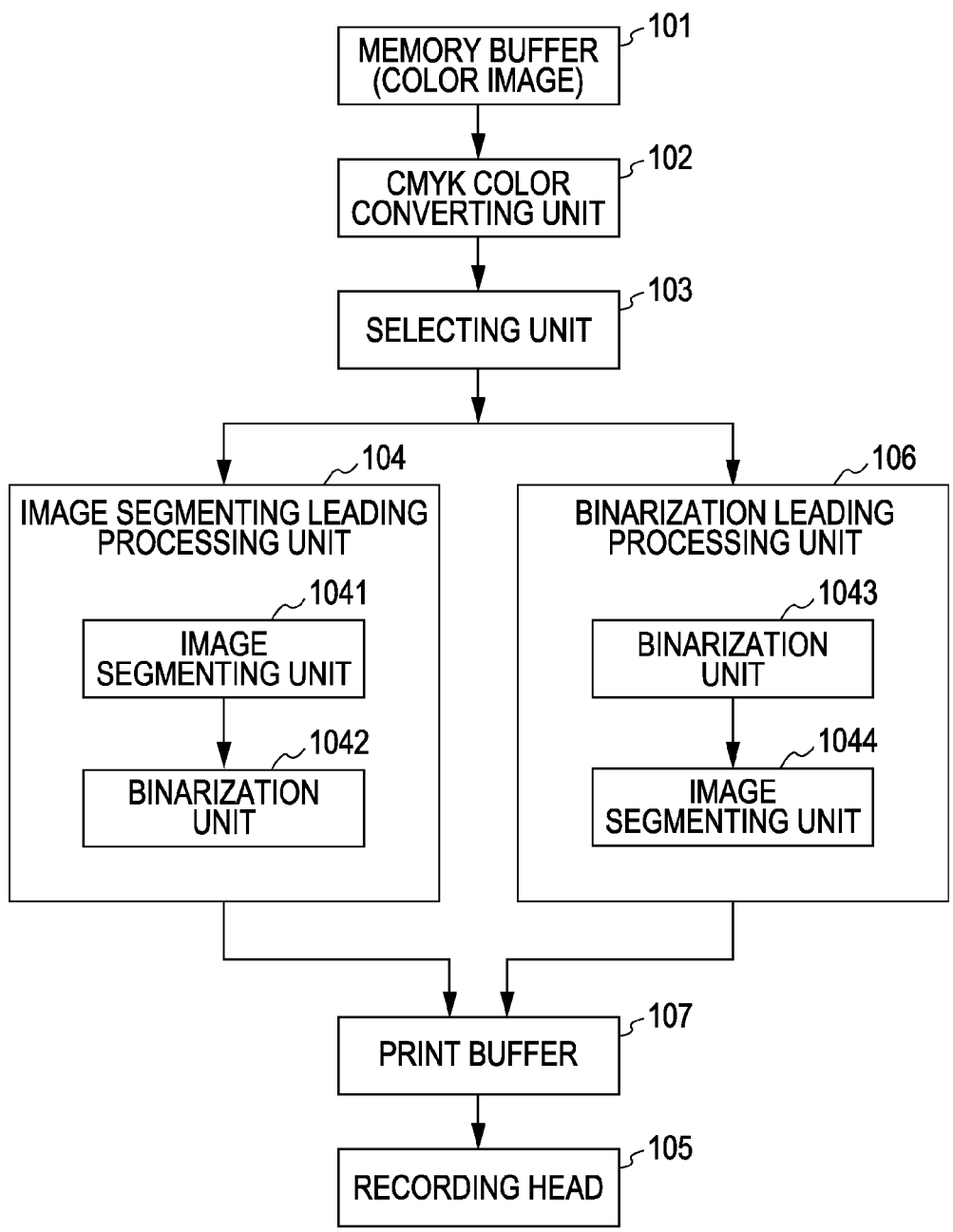
FIG. 5 is a block diagram to describe an embodiment of a process for image processing executed by a recording apparatus.

FIG. 5 is a block diagram to describe an example of a process of image processing executed by the recording apparatus according to the present embodiment. For example, when image data is received along with recording commands from an externally connected host apparatus or the like, the commands and image data may be stored in a memory buffer 101 within the recording apparatus. Normal recording commands include, for example, commands to specify recording modes serving as material to determine the number of multi-passes (N) or the type of recording medium. Also, the image data at this time may have multivalued brightness data (R, G, B) expressed with 8-bit, 256 colors for each pixel, for example. The brightness data stored in the memory buffer 101 is then transferred one pixel at a time to the CMYK converting unit 102, and is converted to CMYK density data of a multi-valued type (8-bit, 256 colors) which may correspond to the ink color used by the recording apparatus.

According to this embodiment, the selecting unit 103 selects, as a processing unit for the image data, an image segmenting leading processing unit (i.e., a first image processing unit) or binarization leading processing unit (i.e., a second image processing unit) according to the number of multi-passes (N) determined by the recording mode received from the host apparatus. Note that as described below, with the image segmenting leading processing unit (i.e., first image processing unit), a first processing mode that performs quantizing processing (e.g., binarizing processing in the present example) after image segmenting processing, is executed. On the other hand, with the binarization leading processing unit (i.e., second image processing unit), a second processing mode that performs image segmenting processing after quantizing processing (e.g., binarizing processing in the present example), is executed.

Figure 6:
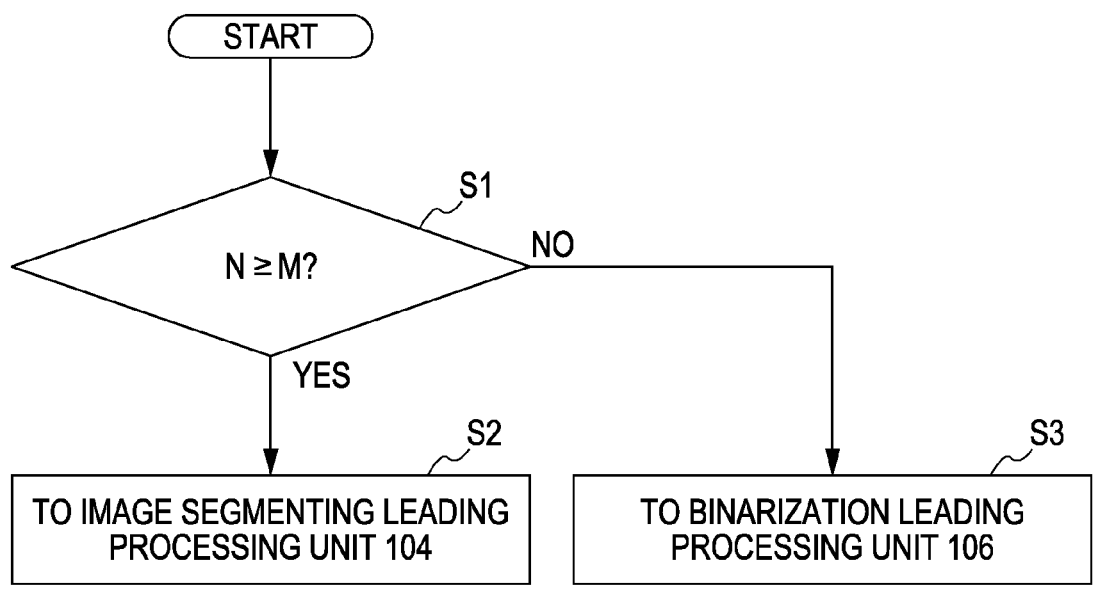
FIG. 6 is a flowchart to describe an embodiment of selecting processing executed by a selecting unit according to the embodiment of FIG. 5.

FIG. 6 is a flowchart describing an example of the selecting processing executed by the selecting unit 103 in accordance with the present embodiment. In step s1, the selecting unit 103 determines whether or not the number N of multi-passes is at or above a threshold value M (N≧M?). In the case determination is made that the number N of multi-passes is at or above a threshold value (N≧M), the flow is advanced to step S2, wherein the image segmenting leading processing unit 104 (i.e., first image processing unit) for executing the first processing mode is selected, and the image data to be processed is transferred to the image segmenting leading processing unit 104. On the other hand, in the case determination is made that the number N of multi-passes is below a threshold value (N<M), the flow is advanced to step S3, wherein the binarization leading processing unit 106 (i.e., second image processing unit) for executing the second processing mode is selected, and the image data to be processed is transferred to the binarization leading processing unit 106. The first image processing unit is a processing unit to perform a series of processing steps (i.e., the first processing mode), such as segmenting the multivalued image data into multiple pieces of multivalued image data corresponding to the multiple relative movements, wherein the multiple pieces of multivalued image data are each quantized (e.g., binarized). On the other hand, the second image processing unit is a processing unit to perform a series of processing steps (i.e., second processing mode) such as quantizing the multivalued image data (e.g., binarizing), and segmenting the quantized image data into multiple pieces of quantized image data corresponding to the multiple relative movements.

In the case that the number of times N of multi-passes is at or above the threshold value, the first processing mode (e.g., multivalued data segmenting method) is selected, and in the case that the number of times N of multi-passes is below the threshold value, the second processing mode (e.g., mask segmenting method) is selected. An example of a reason for this will be described. With a relatively high-speed recording mode wherein the value of N is relatively small, images with fairly high contrast such as text and border patterns are often recorded, but if the dot coverage of such images is relatively low, there may be cases where this is perceived to be an image distortion. Thus, with the present embodiment, in the case of a low-pass mode having a relatively small value of N, rather than employ a multivalued data segmenting method, which may tend to have relatively low dot coverage, a mask segmenting method may be employed that tends to have relatively high dot coverage. On the other hand, a relatively high quality recording mode having a relatively large value of N is often used for recording photographic images. With a photographic image, evenness and smoothness of the image may be of significant concern, and any density fluctuation may be perceived as an image distortion. Thus, with the present embodiment, in the case of a high-pass mode having a relatively large value of N, the multivalued data segmenting method, which can excel in suppressing density fluctuations, may be employed. Thus, with a low-pass mode, the image processing mode may be selected with more concern for the quality of text and/or lines than robustness, and with a high-pass mode, the image processing mode may be selected with more concern for robustness, which may provide improved quality of the photographic images.

Referring again to FIG. 5, the multivalued image data input to the image segmenting leading processing unit 104 may be segmented into N pieces of multivalued image data (N planes) for each pixel by the image segmenting unit 1041 (i.e., first segmenting unit). In this case, the image segmenting unit 1041 can segment the multivalued image data into N planes equally, but for example as disclosed in the Japanese Patent Laid-Open No. 2006-231736, segmenting the multivalued image data into N planes according to different segmenting rates can also be performed. Following this step, the N pieces of multiple image data (N planes) segmented by the image segmenting unit 1041 may each be subjected to binarizing processing by the binarization unit 1042 (i.e., first quantizing unit). The binarizing processing method may be, for example, at least one of an error diffusion method and a dither matrix method. However, in one version, the methods of binarizing processing may be varied between the N planes. For example, in the case of overlaying N planes as shown in the below-described FIG. 17, the binarizing processing may be performed such that the locations that dots are overlaid one upon another and the locations that no dots are overlaid one upon another are not in a row. For example, if using error diffusion processing as the binarizing processing method, the threshold or error distribution matrix may be varied so that the result of the binarizing processing does not provide the same values. For example, by using an error distribution matrix shown in FIG. 18A in error diffusion processing for one plane and using an error distribution matrix shown in FIG. 18B in error diffusion processing for the other plane, it is possible to make the dot arrangements to be different between the planes. In addition, dot arrangement can also be made to be different between the planes by using different dither matrices for one plane and the other plane. Furthermore, the dot arrangement can be made to be different between the planes by using the dither matrix method for one plane and the error diffusion method for the other plane.

Figure 17:
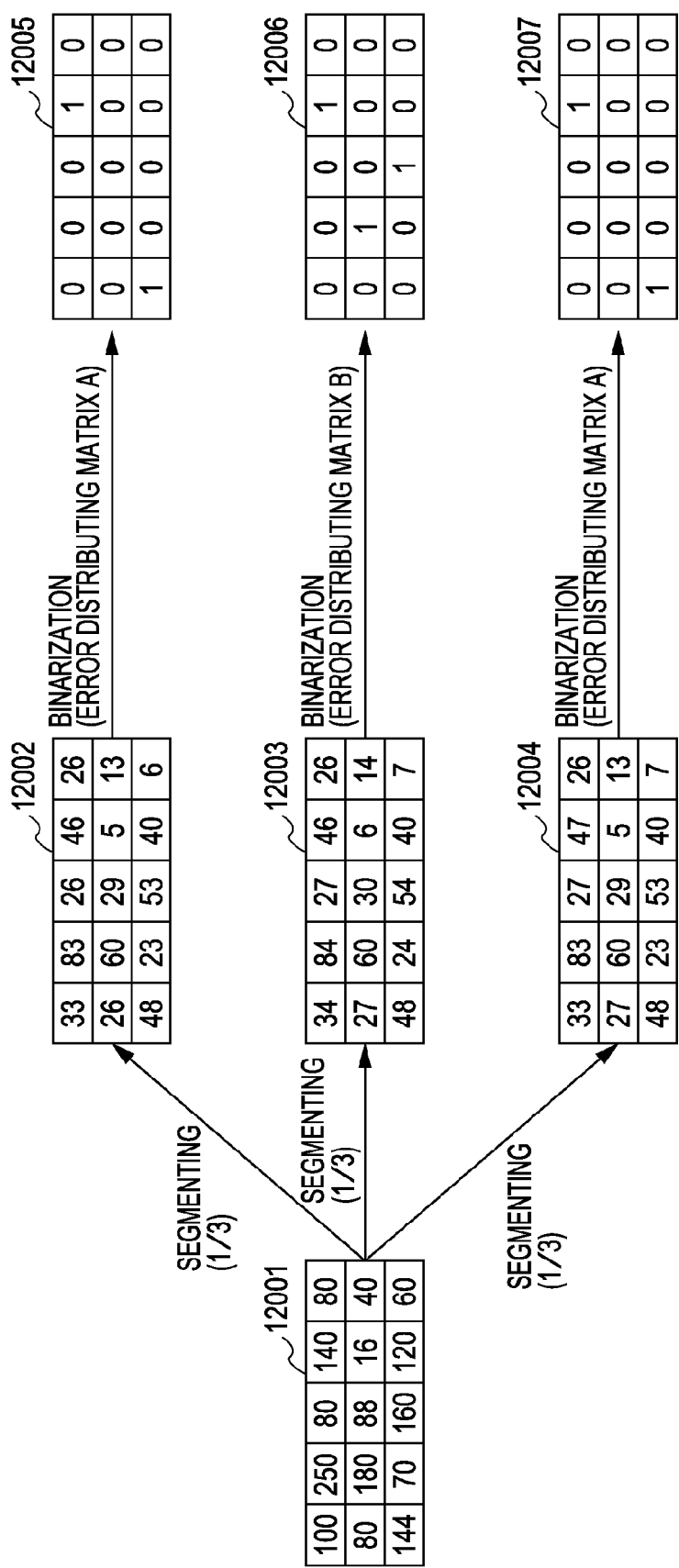
FIG. 17 is a diagram illustrating a specific example of processing executed with the image segmenting leading processing unit according to the embodiment of FIG. 5.

FIG. 17 shows a specific example of a first processing mode executed with the image segmenting leading processing unit 104 (i.e., first image processing unit), and uses an example of 3-pass multi-pass recording for description thereof. With the image segmenting unit 1041, the multivalued image data (12001) to be recorded in the unit areas made up of 5 pixels×3 pixels are segmented into three pieces. Thus, the multivalued image data (12001) is segmented into multivalued image data (12002) for the first pass, multivalued image data (12003) for the second pass, and multivalued image data (12004) for the third pass. Next, with the binarizing processing unit 1042, binarizing processing is performed with an error diffusing method with respect to each of the multivalued image data segmented with the image segmenting unit 1041 (12002, 12003, 12004). Thus, binary image data for the first pass (12005), binary image data for the second pass (12006,) and binary data for the third pass (12007), are generated. Specifically, by performing error diffusing processing using an error distribution matrix A according to the embodiment shown in FIG. 18A, binary image data for the first pass (12005) is generated with respect to the multivalued data for the first pass (12002). Also, by performing error diffusing processing using an error distribution matrix B according to the embodiment shown in FIG. 18B, binary image data for the second pass (12006) is generated with respect to the multivalued data for the second pass (12003). Further, by performing error diffusing processing using the error distribution matrix A shown in the embodiment of FIG. 18A, binary image data for the third pass (12007) is generated. Note that the asterisk * in FIGS. 18A and 18B indicates a pixel of interest.

Figure 4:
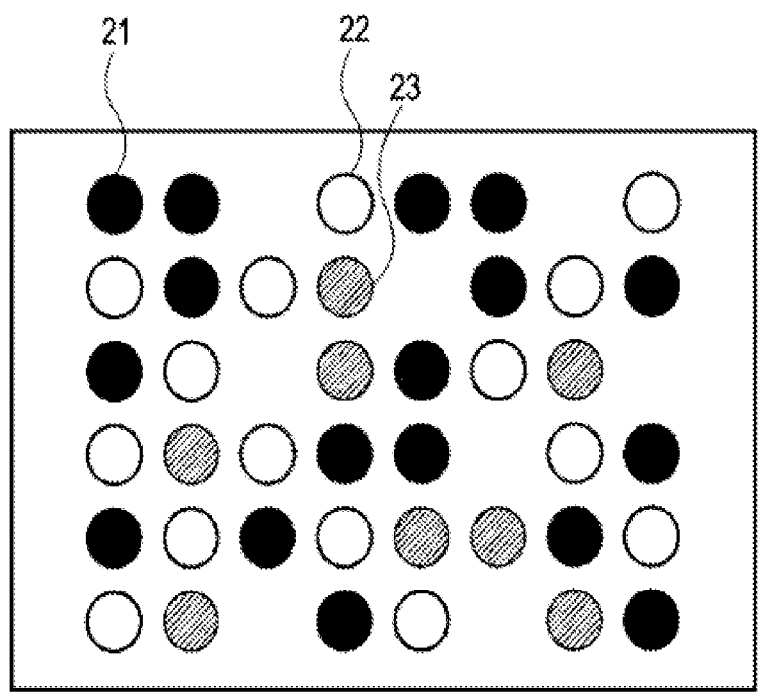
FIG. 4 is a diagram illustrating an example of a dot array state on a recording medium.

According to the above processing embodiment, in the case of overlaying the three planes (12005, 12066, and 12007), the locations where dots are overlaid one upon another (pixel wherein "1" exists in at least two planes) and the locations where dots are not overlaid one upon another (pixel wherein "1" exists in only one plane) can be arrayed in a row. Accordingly, as described with reference to the embodiment in FIG. 4, even if recording position shifting occurs in accordance with fluctuations in distance between the recording medium and discharge output face, or fluctuations in conveying amounts of the recording medium, and so forth, density fluctuations of the image can be suppressed. Thus, the first processing mode executed with the image segmenting leading processing unit 104 (i.e., first image processing unit) may be a mode to realize image processing with relatively strong robustness.

Referring again to FIG. 5, the multivalued image data input in the binarization leading processing unit 106 may be binarized with the binarization unit 1043 (i.e., second quantizing unit). Following this step, the binary image data obtained with the binarization unit 1043 may be segmented into one of N planes in pixel increments with the image segmenting unit 1044 (second segmenting unit). The method for the binarizing processing employed with the binarization unit 1043 may also be at least one of an error diffusion method and a dither matrix method, as with the binarization unit 1043.

Figure 2:
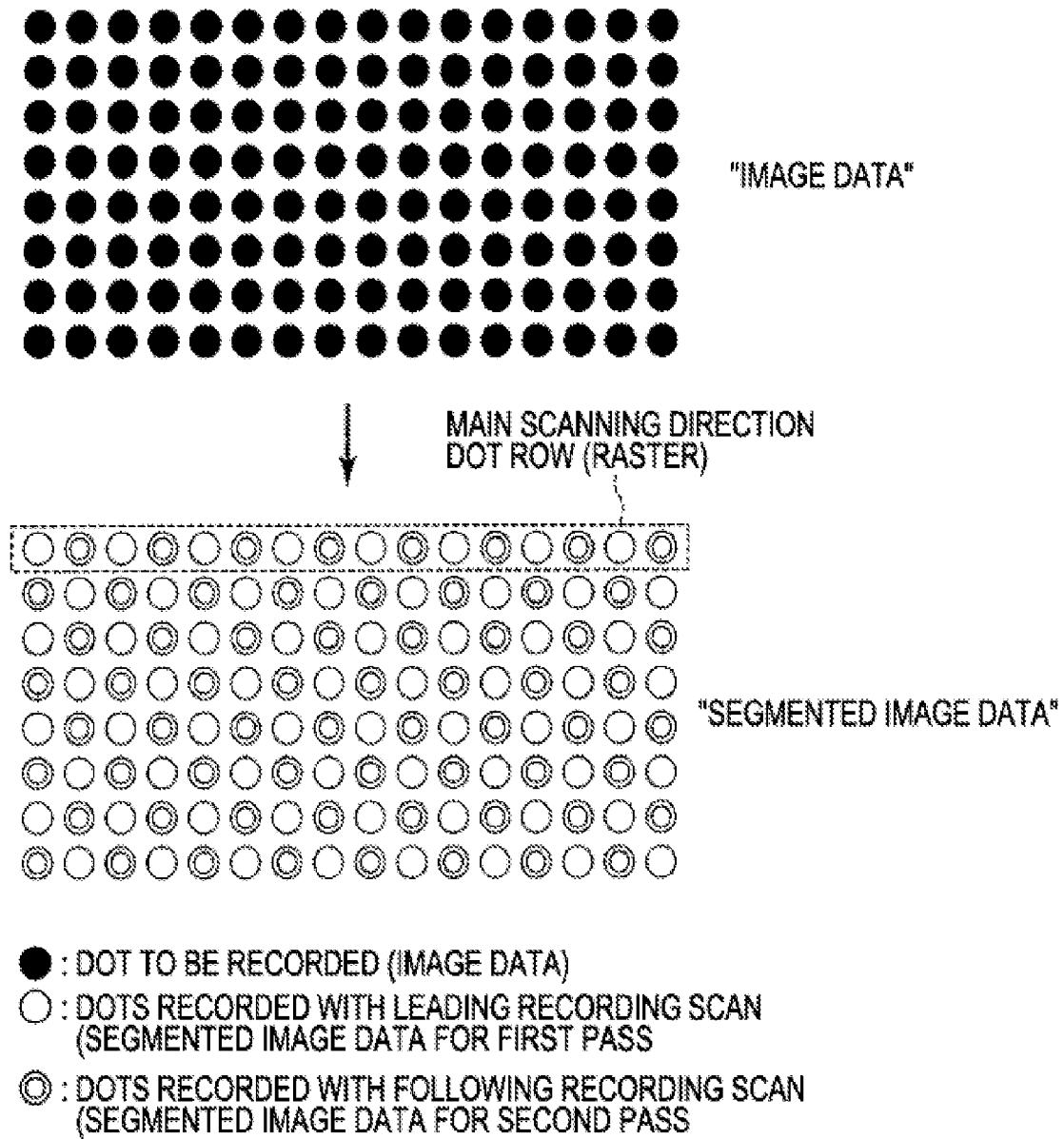
FIG. 2 is a diagram illustrating an embodiment of the result of segmenting binary image data into segmented image data corresponding to two recording scans with a mask pattern according to the embodiment of FIG. 13.
Figure 13:
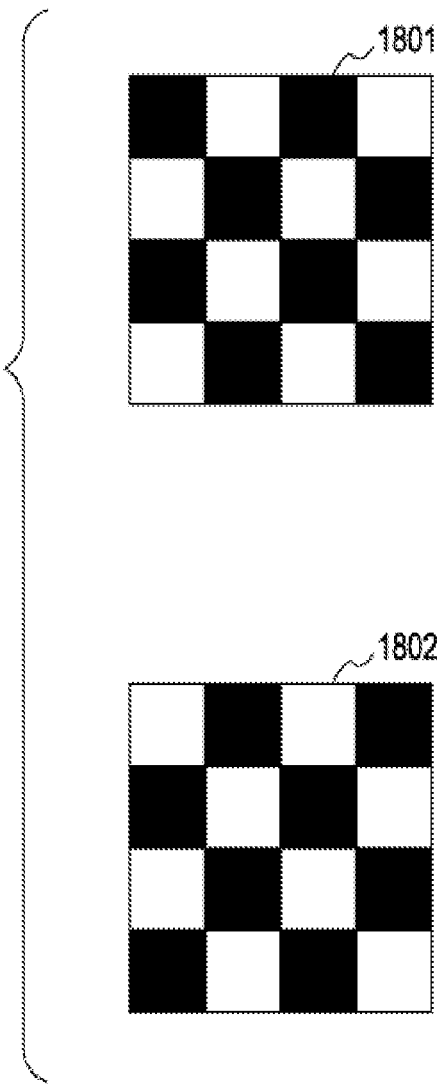
FIG. 13 is a schematic diagram illustrating an example of a mask pattern usable with multi-pass recording with two passes.
Figure 14:
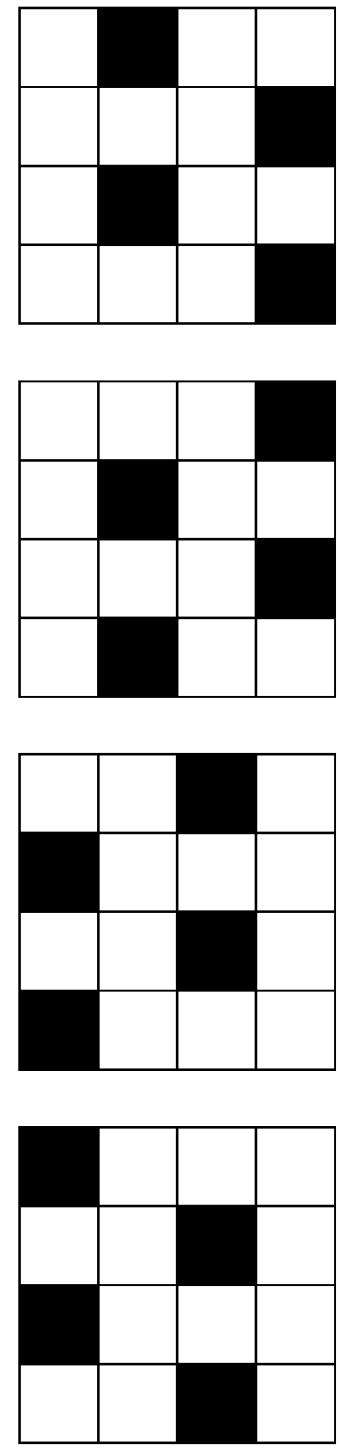
FIG. 14 is a schematic diagram illustrating an example of a mask pattern usable with multi-pass recording with four passes.
Figure 16:
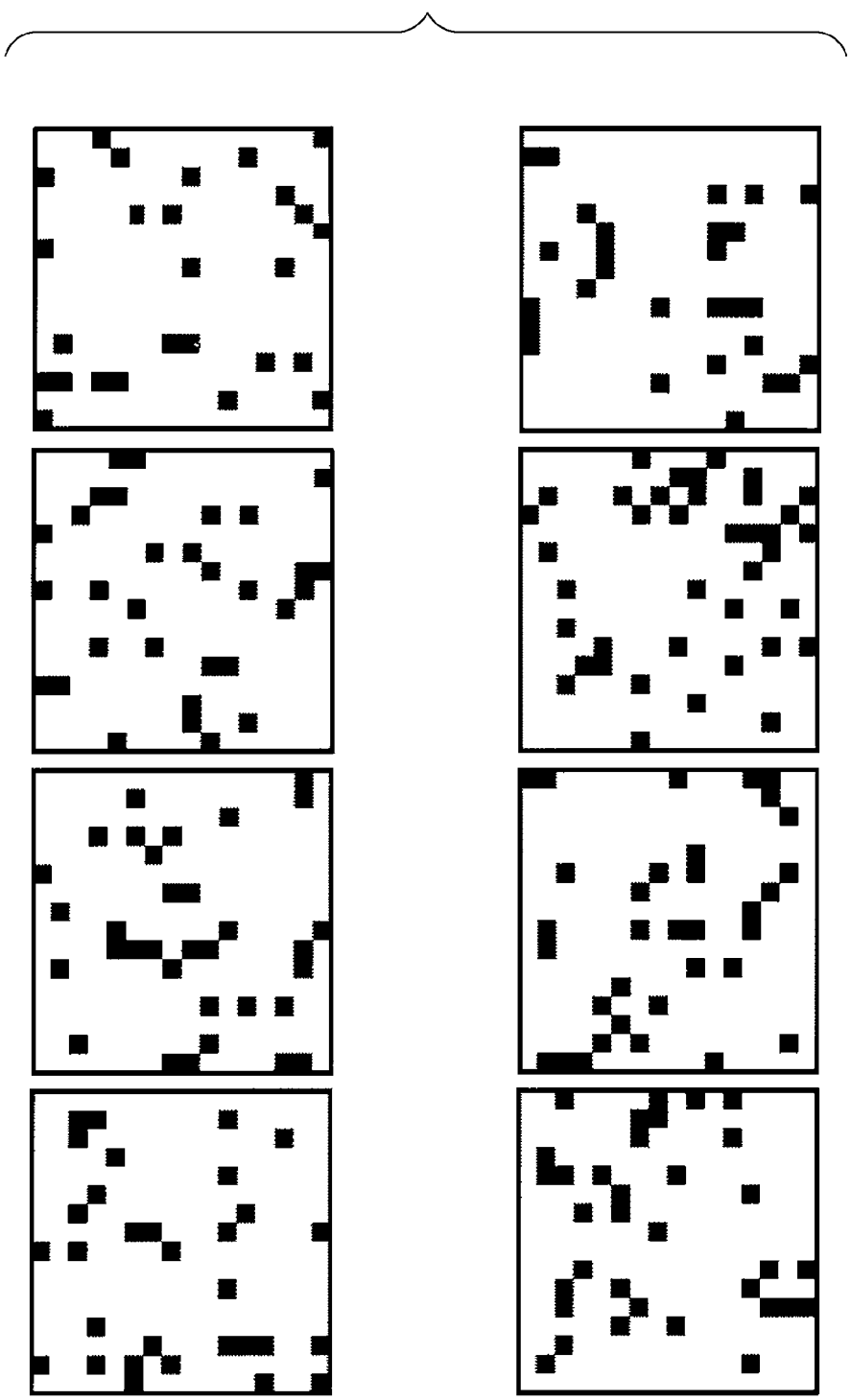
FIG. 16 is a schematic diagram illustrating an example of a mask pattern usable with multi-pass recording with eight passes.

Also, the image segmenting method for the image segmenting unit 1044 may not be particularly restricted. For example, a mask pattern in a mutual supplementing relation such as shown in the embodiment of FIG. 13 for a 2-pass, in the embodiment of FIG. 14 for a 4-pass, and the embodiments of FIG. 15 or 16 for an 8-pass, may be used. Further, a random mask pattern, such as that described in Japanese Patent Laid-Open No. 7-52390, or a layered mark pattern, such as that described in Japanese Patent Laid-Open No. 2006-044258, may also be used. Also, the multivalued image data may be segmented such that the recording pixels on the same plane are not disposed continuously vertically/horizontally as in FIG. 2. Regardless of which method is employed, binary image data that is in a mutually supplementing relation after segmenting can demonstrate advantages in the present embodiment.

Figure 19:
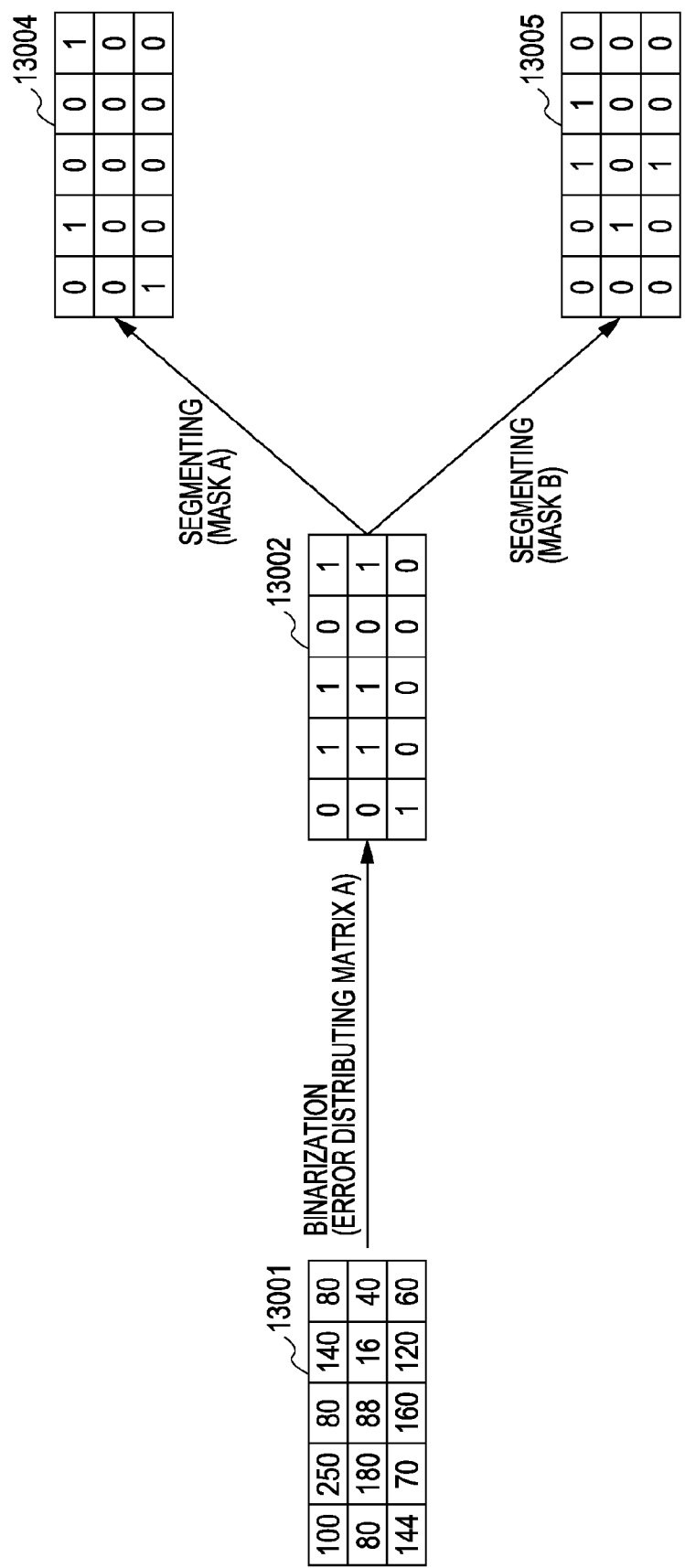
FIG. 19 is a diagram illustrating a specific example of processing executed with the binarization leading processing unit in FIG. 5.
Figure 20A:
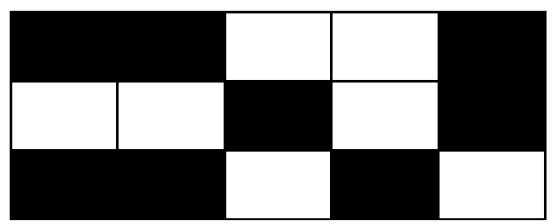
FIGS. 20A and 20B are diagrams illustrating an embodiment of a mask pattern used in the event of the segmenting processing executed with the image segmenting unit according to the embodiment of FIG. 5.
Figure 20B:
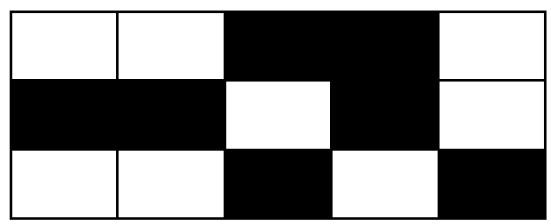

FIG. 19 illustrates a specific example of a second processing mode executed with the binarization leading processing unit 106 (i.e., second image processing unit) in the embodiment of FIG. 5, and here gives the example of 2-pass multi-pass recording. With the binarization unit 1043, binarizing processing is performed with an error diffusing method using the error distribution matrix A shown in the embodiment of FIG. 18A, with respect to the multivalued image data (13001) to be recorded in the unit area made up of 5 pixels×3 pixels. Thus, the binary image data (13002) to be recorded in the unit area is generated. Next, with the image segmenting unit 1044, the binary image data (13002) generated with the binarization unit 1043 may be segmented with a mask pattern into first binary image data (13004) for the first pass, and second binary image data (13005) for the second pass. Specifically, by thinning the binary image data (13002) with the mask pattern A shown in the embodiment of FIG. 20A, the binary image data (13004) for the first pass may be generated. Also, by thinning the binary image data (13002) with the mask pattern B shown in the embodiment of FIG. 20B, the binary image data (13005) for the second pass may be generated. Thus, the binary image data (13004) for the first pass, and the binary image data (13005) for the second pass, may be generated. Note that the locations shown in black in the embodiments of FIGS. 20A and 20B indicate recording permitted pixels and the locations shown in white indicate non-recording permitted pixels. According to the above-described processing mode, in the case of overlaying two planes (13004 and 13005), there are no locations where the dots overlay one another (pixels having "1" in both planes), and the planes have a completely supplemental relation. Accordingly, there may be no increase in granular feel by the overlaying of the dots on one another, and a high quality image with relatively little granular feel can be obtained.

Returning yet again to the embodiment of FIG. 5, the image data worth N planes that has been binarized with either the image segmenting leading processing unit 104 or binarization leading processing unit 106, is temporarily stored in a print buffer 107 corresponding to each plane. Following this, the image data is read out from each print buffer during recording scanning, and in accordance with the read out image data the recording head is driven during recording main scanning, whereby ink is discharged from the recording head. Thus, an image may be formed on the unit area of the recording medium by N times of recording main scanning (relative movement).

According to the present embodiment as described above, a first processing mode may be selected wherein, in the case of performing M or more passes of multi-pass recording, after segmenting the multivalued image data into N pieces of multivalued image data, binarizing processing is performed with respect to each of the N pieces of multivalued image data. The N pieces of binary image data obtained by the first processing mode do not have a mutually supplemental relation, so in the output image, there may be pixels here and there wherein multiple dots are recorded in an overlapping manner, and pixels where no recording has been performed. Accordingly, even if recording position shifting occurs between the individual planes, density fluctuation of the image does not readily occur, whereby an image with excellent robustness can be obtained. Thus, this processing may be effective for outputting a relatively high quality photographic image.

On the other hand, in the case of performing multi-pass recording with less than M passes, a second processing mode may be selected wherein, after binarizing the multivalued image data, the binary image data is segmented into N pieces of binary image data in a mutually supplemental relation. Thus the N pieces of binary image data obtained with the second processing mode may have a mutually supplemental relation, so the output image does not have multiple dots overlapping on one another, and the dots may be scattered relatively evenly. Accordingly, a granular feel may be suppressed, and this processing may be effective for outputting an image at a relatively high speed.

With the present embodiment, the threshold value M for determining which of the first processing mode or second processing mode to use is not restricted to a particular value. However, according to an investigation by the present inventors, it has been discovered that cases in which the value of M is defined as 4 or 5 resulted in the advantages according to aspects of the present invention being more favorably and readily realized. That is to say, with the multi-pass recording of 4-pass or 5-pass or greater, the first processing mode in the image segmenting leading processing unit may be executed, and with the multi-pass recording or 3-pass or 4-pass or less, the first processing mode with the binarization leading processing unit may be executed. Thus, between the robustness of the high image quality mode and the reduction in granular feel in the high-speed mode, a balanced, favorable image output can be realized.

Note that while binarizing processing is employed as quantizing processing in the present embodiment, the quantizing processing that is applicable to the present embodiment is not restricted to binarizing processing, and N-valuing (N is an integer of 2 or greater) processing overall can be applied, such as 3-valued processing and 4-valued processing. For example, in the case of employing 3-valued processing, the 3-valued unit replaces the binarization units 1042 and 1043, and ink discharge may be performed based on the 3-valued processing. Also, an arrangement may be made wherein the value of N of the N-valued processing differs between the first processing mode and second processing mode. For example, an arrangement may be made wherein 3-valued processing is employed with the first processing mode, and binarizing processing is employed with the second processing mode. Further, the method for N-valuing processing may be different between the first processing mode and second processing mode, for example with error diffusion being used for the first processing mode and dither matrix being used for the second processing mode, or conversely, with dither matrix being used for the first processing mode and error diffusion being used for the second processing mode.

Figure 7:
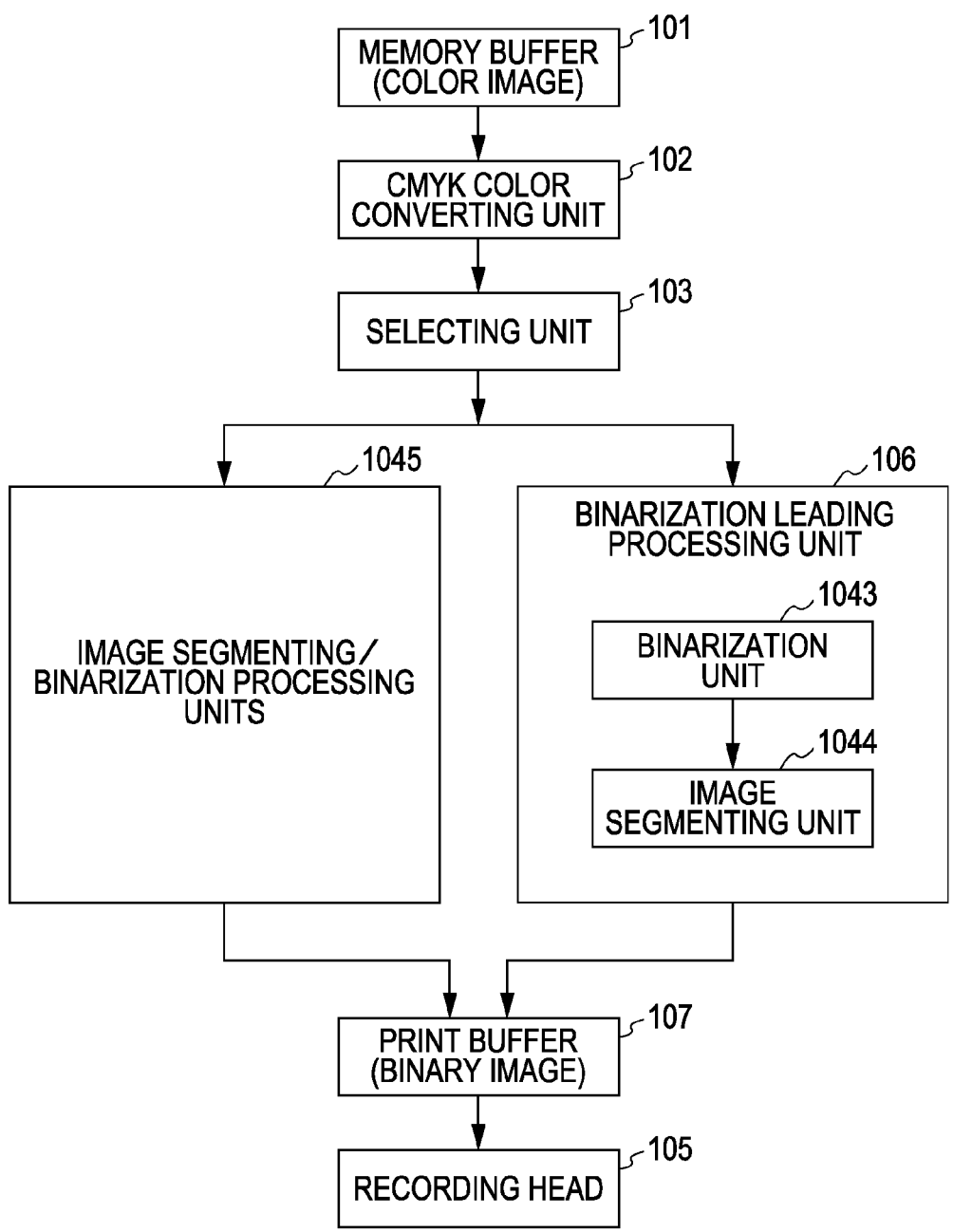
FIG. 7 is a block diagram to describe an embodiment of a process for image processing executed by a recording apparatus according to a second embodiment of the present invention.

A second embodiment of the present invention will be described with reference to the recording apparatus shown in FIG. 1. FIG. 7 is a block diagram to describe an example of the processes for image processing executed by the recording apparatus of the present embodiment. A mechanism that is other than the image segmenting leading processing unit 104, is nonetheless similar to that in FIG. 5 described in the first embodiment. Also, the selecting processing executed by the selecting unit 103 follows the flowchart shown in FIG. 6 similar to the first embodiment. That is to say, with the present embodiment as well, in the case where the number N of multi-passes is at or greater than M, the image segmenting leading processing (i.e., first processing mode) is performed, and in the case where the number N of multi-passes is less than M passes, the binarization leading processing (i.e., second processing mode) is performed.

Figure 8:
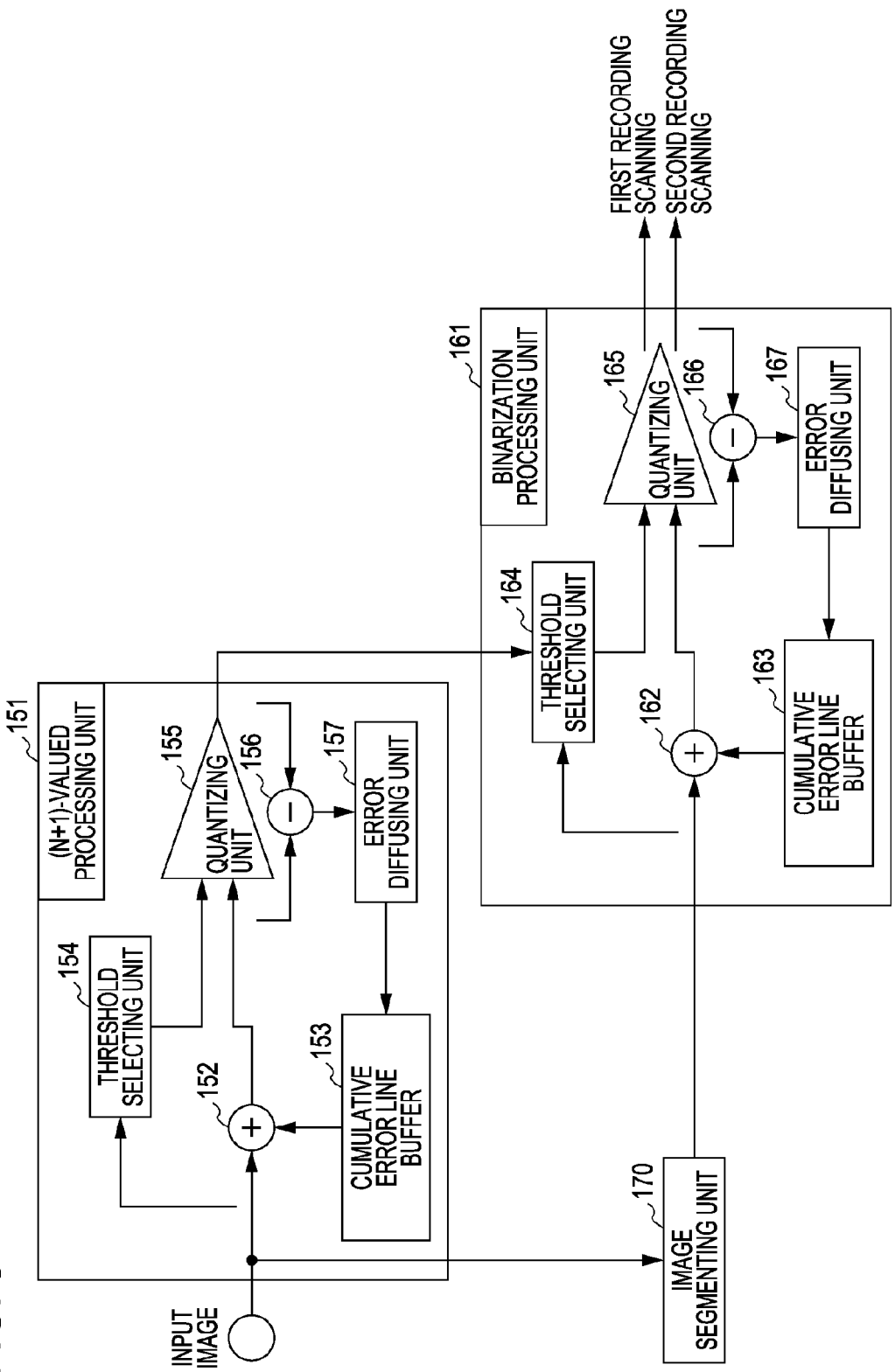
FIG. 8 is a block diagram to describe an embodiment of a processing configuration of an image segmenting/binarizing processing unit.

FIG. 8 is a block diagram to describe an example of the processing configuration of the image segmenting/binarizing processing unit 1045 (i.e. first image processing unit). The image segmenting/binarizing processing unit 1045 of the present embodiment is made up of the three mechanisms of an image segmenting unit 170, (N+1) valued processing unit 151, and binarizing processing unit 161.

In this embodiment, multivalued image data Input_12 that is color-divided by the CMYK color converting unit 102, and transferred with the selecting unit 103 to the image segmenting/binarizing processing unit 1045, is input into each of the (N+1) valued processing unit 151 and image segmenting unit 170. With the (N+1) valued processing unit 151, an error Err_12($x$) stored in a cumulative error line buffer with the adding unit 152 is added to the above Input_12, and the I_12=Input_12+Err_12($x$) is sent to the quantizing unit 155.

In this embodiment, the amount of memory Err_12($x$) for storing the cumulative error corresponding to the position x in the main scanning direction of the pixel of interest is prepared to be the same number as that corresponding to the number of pixels w, in the cumulative error line buffer 153 (i.e. $1 \leq x \leq w$). Also, one pixel worth of error memory Err_12_0 may also be prepared separately.

On the other hand, according to the value of the Input_12, the threshold selecting unit 154 selects a threshold value for (N+1)-valuing in N stages. Here, in the case of N=4, i.e. using the case of 5-valuing as an example, the selecting processing with the threshold selecting unit 154 will be described briefly. For example, in the case that the range of the input value (Input_12) is 0 through 255, the value is 5-valued into the 5 stages of 0, 63, 127, 191, and 255. The threshold selecting unit 154 determines which of the 5 stages the value of the input value Input_12 is in, to determine the threshold value. For example, if the value of the input value Input_12 is 100, the input value is in the range of 63 through 127, whereby a threshold value near 95 may be selected. Of course, in order to reduce dot generating delay, the value may be finely updated near 95. On the other hand, in the case that N=2, i.e. in the case of 3-valuing, the value is 3-valued into the 3 stages of 0, 127, and 255. For example, if the value of the input value Input_12 is 100, the input value is in the range of 0 through 127, so a threshold near 63 may be selected.

According to this embodiment, the quantizing unit 155 uses N threshold values Th_12 selected by the threshold selecting unit 154, and (N+1)-values the image data I_12, to which error has been added. As a result, Out_12 is output from the quantizing unit 155.

With the present embodiment, Out_12 is a value showing the number of dots to be recorded with the first scan through N'th scan as N+1 stages with respect to the pixel to be processed. Specifically, Out_12=0 indicates that not even one dot is recorded on the pixel to be processed, and Out_12=255 indicates that N dots are recorded on the pixel to be processed with the first scan through N'th scan. Also, the value of (N+1) stages therebetween show that multiple dots, less than N, may be recorded by several scans of the first scan through N'th scan.

The error computing unit 156 computes the error Err_12 generated by quantizing from the input value I_12 to the quantizing unit 155 and the output value Out_12. That is to say, $$Err\_12 = I\_12 - Out\_12$$

holds.

The error diffusing unit 157 diffuses (i.e., distributes) Err_12 to the surrounding pixels in accordance with the position x in the main scanning direction of the pixel to be processed (i.e., pixel of interest).

Figure 9:
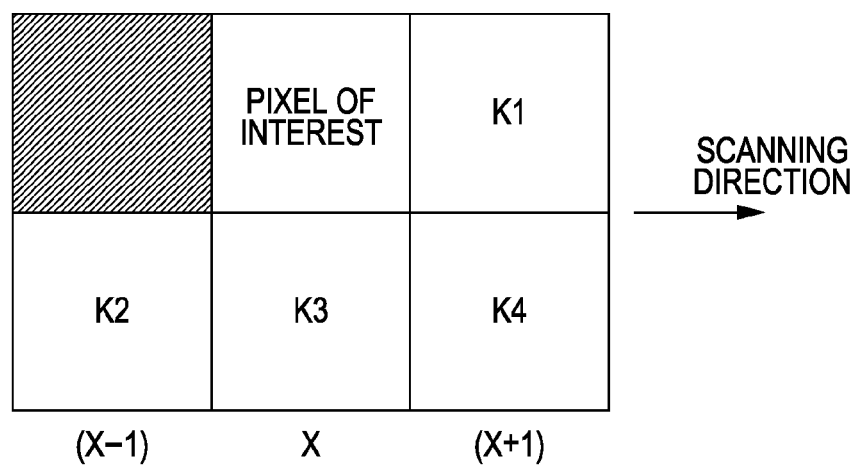
FIG. 9 is a diagram describing an embodiment of an error distribution matrix indicating a diffusion coefficient as to peripheral pixels in the event of performing diffusion processing with error diffusing unit according to the second embodiment.

FIG. 9 is a diagram expressing an embodiment of an error distribution matrix showing diffusion coefficients with respect to the surrounding pixels in the event of performing diffusing processing with the error diffusing unit 157. Error is diffused with respect to the various surrounding pixels adjacent to the pixel of interest shown in the diagram in the main scanning direction and sub scanning direction, based on four coefficients K1 through K4 with the present embodiment. With the present embodiment, it is assumed that $K1=7/16$, $K2=3/16$, $K3=5/16$, and $K4=1/16$. That is to say, of the error occurring with the pixel of interest, $7/16$ of these are scattered on pixels adjacent to the right which are to be processed next after the pixel of interest, and the remaining $9/16$ are scattered on the pixels of the next line (the line below) from the line to which the pixel of interest belongs. The Err_12(1) through Err_12($w$) for managing the cumulative error do not indicate cumulative error of the pixels positioned on the same line. If it is assumed that the coordinate of the pixel of interest in the main scanning direction is x, Err_12 ($x$+1) through Err_12 ($w$) indicate pixels in the same line as the pixel of interest, and Err_12 (1) through Err_12 ($x$) indicate cumulative error of the pixels in the line directly below the pixel of interest. Each time the position of the pixel of interest advances, the positions indicated by the error memory shift downward one pixel at a time. On the other hand, in the event of scattering the errors occurring with the pixel of interest, the pixel positioned adjacent to the right of the pixel of interest and the pixel positioned adjacent to the lower right both have a coordinate of (x+1) in the main scanning direction. Accordingly, in order to distinguish and store the error with respect to the pixel positioned adjacent to the lower right from the cumulative error Err_12 ($x$+1) adjacent to the right, a memory Err_12_0 of one pixel worth is used. That is to say, the error with respect to the surrounding pixels may be scattered and cumulatively added as shown below, and the results thereof may be overwritten on the cumulative error line buffer.

$$E\_12(x+1)=E\_12(x+1)+\text{Err}\_12 \times K1 (x<W)$$

$$E\_12(x-1)=E\_12(x-1)+\text{Err}\_12 \times K2 (x>1)$$

$$E\_12(x)=\text{Err}\_12\_0+\text{Err}\_12 \times K3 (1<x<W)$$

$$E\_12(x)=\text{Err}\_12\_0+\text{Err}\_12 \times (K2+K3)(x=1)$$

$$E\_12(x)=\text{Err}\_12\_0+\text{Err}\_12 \times (K1+K3+K4)(x=W)$$

$$\text{Err}\_12\_0=\text{Err}\_12 \times K4 (x<W)$$

$$\text{Err}\_12\_0=0(x=W)$$

Note that the initial values of the cumulative error line buffer 153 may all be 0, or settings may also be made with random values.

On the other hand, the multivalued image data Input_12 may be segmented into approximately 1/N with the image segmenting unit 170, obtaining multi-valued data reduced to approximately 1/N for recording with each of the first scan through N'th scan. The segmenting method herein may be the same as the method with the image segmenting unit 1041 of the first embodiment described above. That is to say, the multivalued image data Input_12 may be segmented N ways equally according to the segmenting rate, or may be segmented into N according to different segmenting rates. If the segmenting method with the image segmenting unit 170 has no regularity, the number of dots or positions of dots will not be significantly biased toward either recording scan. That is to say, with the first scan through N'th scan, the dots can be scattered and recorded at a ratio. It goes without saying that in the case of approaching one of the recording scans towards the optimal dot positions so as to prioritize to be favorable for the image forming apparatus, the multivalued data may be distributed at a priority with respect to the scan corresponding to the plane thereof with the image segmenting unit 170.

The multivalued data Input after segmenting with the image segmenting unit 170 is input to the binarization processing unit 161. The input signal value Input is added to the error Err_1(x) stored in the cumulative error line buffer 163 with the adding unit 162, and I=Input+Err(x) is transferred to the quantizing unit 165.

On the other hand, Input is also transferred to the threshold selecting unit 164, and the threshold selecting unit 164 selects a threshold for binarization according to the value of Input. The selecting processing with the threshold selecting unit 164 may be similar to the selecting processing with the above-described threshold selecting unit 154. However, with the binarizing processing unit of the present example, preparing multiple thresholds may not be required. Regardless of the value of the input image data Input, the threshold selecting unit 164 can set a threshold Th as a constant. It goes without saying that in order to avoid dot generating delay, the threshold Th may be more finely updated according to the input pixel data Input.

A quantizing unit 165 compares the threshold Th selected by the threshold selecting unit 164, the image data I added with the error, and the output value Out_12 from the (N+1)-valued processing unit 151. That is to say, with the value of Out_12, the total number of dots output with N scans is determined, and which scan to record this with is determined by comparing the threshold Th and image data I. For example, in the case that the total number of dots determined with Out_12 is A, if the image data I is greater than the threshold, recording is performed with A scans of the first half, and if the image data I is smaller than the threshold, recording is performed with A scans of the latter half. It goes without saying that other restrictions may also be created, and A times may be distributed to N times corresponding thereto. Thus, the output value Out_1 of the first scan through the output value Out_N of the N'th scan may be determined. With such a configuration, the output value Out_1 of the first scan through the output value Out_N of the N'th scan may be determined simultaneously with the quantizing unit 165.

An error computing unit 166 computes an error Err_1 which is the difference between I and the output pixel value Out_1. That is to say, $$\text{Err}\_1=I-\text{Out}\_1$$

holds.

An error diffusing unit 167 performs diffusing processing to the periphery of Err_1 with the same method as the (N+1)-valued processing unit 151 according to the position x in the main scanning direction of the pixel to be processed (i.e., pixel of interest). Assuming that the maximum value of the coordinate x, i.e. the number of pixels in the main scanning direction is w, and the cumulative error in the coordinate x is E_1(x), the error as to the periphery pixels is diffused as shown below.

$$E\_1(x+1)=E\_1(x)+\text{Err}\_1 \times K1 (x<W)$$

$$E\_1(x-1)=E\_1(x)+\text{Err}\_1 \times K2 (1<x)$$

$$E\_1(x)=\text{Err}\_1\_0+\text{Err}\_1 \times K3 (1 \leq x \leq W)$$

$$E\_1(x)=\text{Err}\_1\_0+\text{Err}\_1 \times (K2+K3)(x=1)$$

$$E\_1(x)=\text{Err}\_1\_0+\text{Err}\_1 \times (K1+K3+K4)(x=W)$$

$$\text{Err}\_1\_0=\text{Err}\_1 \times (K4)(x<W)$$

$$\text{Err}\_1\_0=0(x=W)$$

In order to diffuse and accumulate the errors as above, the cumulative error line buffer 163 may have a storage area Err_1_0 for one pixel and a storage area E_1(x) for the pixels corresponding to the number of pixels w in the main scanning direction. Each time the pixel of interest changes, the error is cumulative based on the expressions above. Note that the initial values of the cumulative error line buffer 163 may be all 0, or may be set with random values.

According to the first processing mode of the present embodiment described above, with one quantizing unit 165, binary data with the first scan through N'th scan can be output simultaneously.

A third embodiment is also described with reference to the recording apparatus shown in FIG. 1. FIG. 10 is a block diagram to describe an example of a process of the image processing executed by the recording apparatus of the present embodiment. The configurations other than the image segmenting leading processing unit 1046 are the same as those of the above-described first embodiment. That is to say, in the case that the number N of multi-passes is at or above M, the first processing mode is executed with the image segmenting leading processing unit 1046 (i.e., the first image processing unit), and in the case that the number N of multi-passes is less than M, the second processing mode is executed with the binarization leading processing unit 106 (i.e., the second image processing unit).

With the present embodiment, binarizing processing is executed with the binarization unit 1042 with regard for the binarization results of other planes, so that the positions of dots recorded with the same recording scans are scattered as much as possible and that the dots recorded with different recording scans are not excessively overlaid. Specifically, in performing sequential binarizing processing (i.e., sequential quantizing processing) with respect to multiple planes segmented with the image segmenting unit 1041, binarizing processing for subsequent planes may be performed based on the results of the binarizing processing of the planes subjected to preceding processing. Hereafter, the processing of the image segmenting leading processing unit 1046 according to the present embodiment will be described in detail.

In one embodiment, the multivalued image data input to the image segmenting leading processing unit 1046 is segmented into N planes by the image segmenting unit 1041. The segmenting method in this embodiment may even be similar to the above-described first embodiment. The plane corresponding to the first recording scan with respect to the unit area of the recording medium is defined as a first plane, and the plane corresponding to the K'th recording scan with respect to the unit area of the recording medium is defined as a K'th plane. (K is an integer where $1<K\leq N$.)

The example of processing described below is performed in order from the first plane. The multivalued image data of the first plane is stored without change in the memory buffer 1047, and thereafter is transferred to the binarization unit 1042.

The binarization unit 1042 uses, for example, at least one of an error diffusing method and dithering matrix method, similar to the above-described first embodiment, and performs binarizing processing with respect to each of the image data stored in the memory buffer 1047. The obtained binary data is transferred to the print buffer 107, and upon memory worth one recording scan being accumulated, the recording head 105 performs recording scanning according to the binary data stored in the print buffer. On the other hand, the result of the binarizing processing of the first plane may also be transferred to a constraint information computing unit 1048.

FIGS. 11A and 11B are diagrams illustrating examples of coefficients used in the event of the constraint information computing unit 1048 performing filter computing, and the computation results thereof, with respect to the binary data for the first plane output from the binarization unit 1042. The shaded pixels are the pixels of interest subject to processing by the binarization unit 1042, and the constraint information computing unit 1048 distributes the binarization results of the pixel of interest to the peripheral pixels based on the coefficients shown in FIG. 11A. Specifically, if the output from the binarization unit 1042 is 1 (recording), this "1" is converted to a value (e.g. 255) to be input from the image segmenting unit 1041 to the binarization unit 1042, and following this, the product of the converted value ("255") and the coefficient shown in FIG. 11A is obtained. As a result, the pixel of interest and the values of the periphery pixels are as shown in the example of FIG. 11B. That is to say, if the output from the binarization unit 1042 is 1 (recording), the distribution result to the periphery pixels is as shown in the example of FIG. 11B.

Figure 12:
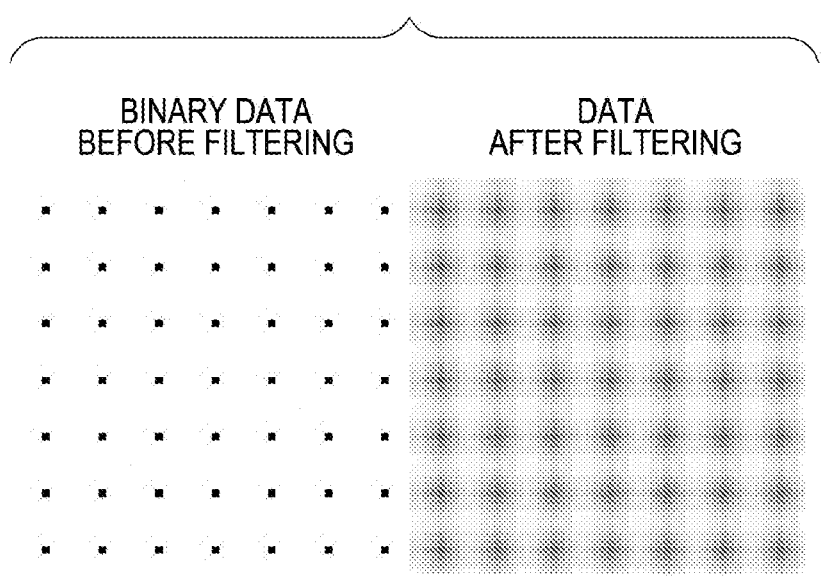
FIG. 12 is an image diagram illustrating embodiments of output results from the binarization unit, and the results of performing the filtering processing according to the embodiment of FIG. 11.

FIG. 12 is an image diagram showing an example of output results from the binarization unit 1042 (binary data before filtering) and the results of performing the above-mentioned filtering processing (data after filtering) with respect to the output results herein. The constraint information computing unit 1048 converts the distribution value (e.g., the value in FIG. 11B) thus obtained into a negative value, and adds the converted value to multivalued data before binarization for the first plane, so as to obtain corrected data (i.e., constraint information). The corrected data is multivalued corrected data for correcting the multivalued image data for the second plane. The multivalued corrected data (constraint information) thus obtained is stored in the pixel position for the second plane of the memory buffer 1047.

In the subsequent second plane processing, the multivalued image data is added to constraint information (i.e., multivalued corrected data) stored beforehand and is saved in the memory buffer 1047. Following this, binarizing processing is performed similar to the first plane, and the obtained binary data is transferred to the print buffer 107. The binarization results of the second plane may also be transferred to the constraint information computing unit 1048 similar to the output results for the first plane.

With the processing described above, with the binarizing processing for the second plane, the pixel data value defined as recording (1) with the first plane becomes lower than the original value, whereby the probability of the relevant pixel and the surrounding pixels to be recording (1) by the binarizing processing is reduced. Consequently, with the area of the recording medium recorded with the first plane (first recording scan) and the second plane (second recording scan), the ratio of pixels recorded with two dots overlaid is suppressed to be lower as compared to the above-described embodiment. As a result, worsening of the granular feel by dots being excessively overlaid can be suppressed.

The binarizing processing of the subsequent third plane through N'th plane is also thus performed sequentially. That is to say, as the multivalued data for each plane is sequentially quantized (binarized), based on the results of binarizing (quantizing) of a plane subjected to the preceding processing, binarizing processing for the subsequent plane is performed. The constraint information computing unit 1048 accumulates the results following filtering processing with respect to the first plane through the (N−1)'th plane in predetermined pixel positions sequentially in the memory buffer 1047. Accordingly, in the case of performing binarizing processing of the multivalued image data of K planes for example, dots may be difficult to record with the K'th recording scan on the pixels recorded (1) with one of the first through (K−1)'th plane. According to the above processing, the probability of dots recorded by different recording scans overlapping can be reduced.

As described above, in order to suppress the density fluctuations that accompany shifts between planes, not having the dots with multiple recording scans in mutually supplemental relations, i.e. having pixels recorded with dots overlaid with the multiple recording scans, may be advantageous. However, if there are too many of such pixels, reduced density may occur because of decreased coverage, or worsening of granular feel may occur from excessive dots being overlaid. As with the present embodiment, pixels recorded with dots overlaid from multiple recording scans can exist, but by suppressing the ratio of such pixel to a small amount, the pixels recorded with overlaid dots are not provided in an excessive number, whereby density fluctuations can also be appropriately suppressed. Thus according to the first processing mode of the present embodiment, dot positioning with relatively high density, decreased granularity, and resistance to density fluctuations, can be obtained.

Also, according to the present embodiment, error diffusing processing may be employed, whereby the dots recorded with the same recording scan are appropriately scattered, and the low frequency components of the image with the dot positioning thereof may be suppressed. Therefore, the granularity occurring with the dot positioning within the plane (within the same recording scan) may be improved. Also, generally, when shifting between the planes (between recording scans) occurs, a dot position design (texture) in the individual planes can be confirmed, and this may be perceived as image distortion. However, if the dot positioning in each plane is an excellent positioning for granularity, as with the first processing mode of the present embodiment, even if shifting occurs between planes, the image is less likely to be perceived as image distortion. That is to say, with the first processing mode of the present embodiment, not only may the advantage of suppressing density fluctuations be obtained, but also the robustness as to the texture may be strengthened, whereby an output image with decreased granular feel can be obtained.

Further, by employing the method according to the present embodiment, the ratio of overlaid dots can be decreased as compared to the first embodiment, so the granular feel can be reduced as compared to the first embodiment. Accordingly, the threshold value used with the selecting unit 103 can be set lower, whereby even with a recording mode having a relatively low number of multi-passes, an image with improved robustness can be output in a state wherein granularity is not as obvious.

Note that the present embodiment has, as shown in FIG. 11A, a 3 pixels×3 pixels area as the filter used with the constraint information computing unit 1048, and an isotropic weighted average filter may be used wherein coefficients are arrayed on a roughly concentric circle, but the present embodiment is not limited to these. For example, a larger square such as 5 pixels×5 pixels or 7 pixels×7 pixels may be used, or non-isotropic filter may be used with a rectangle such as 5 pixels×7 pixels or 5 pixels×9 pixels wherein the filter coefficients are in an ellipsoid. Also, a configuration with a low-pass feature or a filter having a band pass feature or bypass feature may be used.

According to the above-described third embodiment, quantizing processing is sequentially performed with respect to the multiple pieces of multivalued image data segmented with the image segmenting unit, whereby subsequent quantizing processing is performed based on the results of the preceding quantizing results. Thus, overlaid dots recorded by different scans can be reduced, thereby providing a recording method with improved robustness and granularity.

Figure 22:
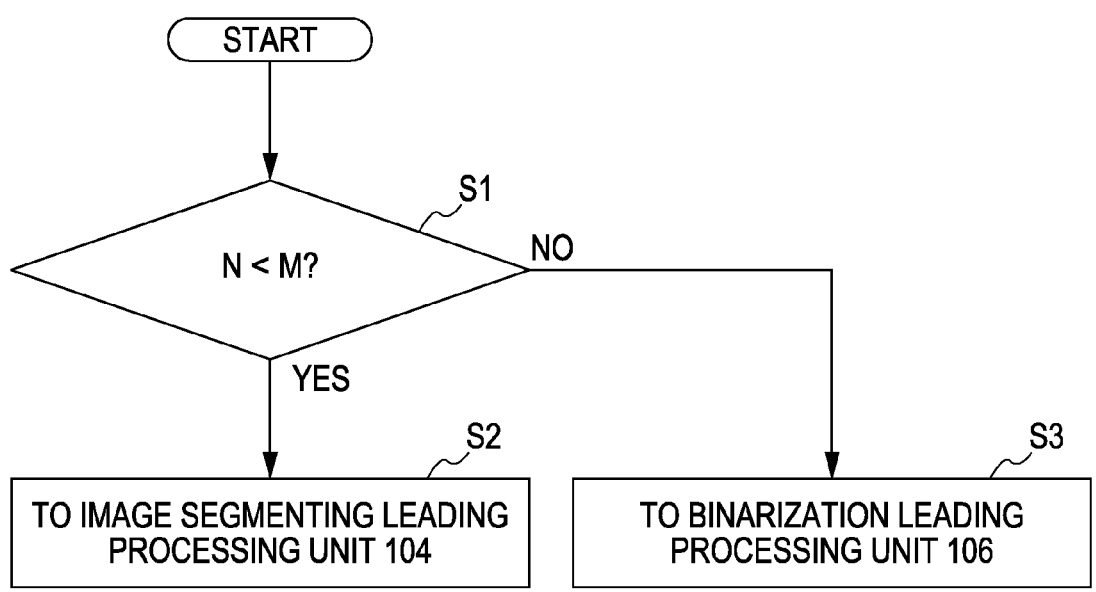
FIG. 22 is a flowchart to describe an embodiment of the selecting processing executed by the selecting unit according to a fourth embodiment.

With the above-described first through third embodiments, according to the flowchart in FIG. 6, in the case where the number of times N of multi-passes is at or above a threshold M, the first processing mode is selected, and in the case where the number N of multi-passes is below the threshold M, the second processing mode is selected. Conversely, in a fourth embodiment, mode selection is performed as the opposite of the mode selection in the first through third embodiments. That is to say, with the fourth embodiment, according to the example shown in the flowchart in FIG. 22, in the case where the number of times N of multi-passes is below the threshold M, the first processing mode is selected, and in the case where the number of times N of multi-passes is at or above a threshold M, the second processing mode is selected. Other than this mode selection, the configuration is the same as that in the first through third embodiments, and thus the description thereof is omitted.

In the case where the number of times N of multi-passes is below the threshold, the first processing mode (i.e., multivalued data segmenting method) is selected, and in the case where the number of times N of multi-passes is at or above a threshold, the second processing mode (i.e., mask segmenting method) is selected. An example of a reason for this will be described. The fewer the number of passes there are of the multi-passes, the greater the conveying error tends to be. Accordingly, the fewer the number of passes there are, the greater the density fluctuations caused by conveying error tends to be. Thus, with the present embodiment, with a low-pass mode having relatively few passes, the multivalued data segmenting method with improved robustness is used. That is to say, with the first embodiment, in the low-pass mode text quality may be prioritized over robustness, and thus the embodiment used the mask segmenting method, but with the present embodiment, robustness may be prioritized over text quality, and therefore the multivalued data segmenting method may be employed.

On the other hand, influences from density fluctuations resulting from conveying error may become smaller as the number of multi-passes increase. For example, when the number of passes is 16 passes or 32 passes and so forth, the influence of density fluctuation resulting from conveying error on image quality may be quite small. Accordingly, with such a high-pass mode, employing the multivalued data segmenting method having improved robustness may have little significance. With the multivalued data segmenting method, binarizing processing may be performed as to the multivalued image data of N planes corresponding to the N multi-passes. Therefore, in the case where the value of N is large, such as with 16 passes and 32 passes, the processing load of the binarizing processing may be quite large, and may greatly increase processing time. For example, in the case of a configuration to perform binarizing processing with a printer driver of a host apparatus connected to the recording apparatus, the processing time may become longer than the printing speed of the printer, whereby the printing speed can be decreased. Thus, with the present embodiment, with a high-pass mode having a relatively large number of passes, the mask segmenting method with a relatively small processing load is employed. Thus, recording can be performed substantially without reducing throughput. Note that as described above, the mask segmenting method may be effective for securing favorable granularity. Accordingly, in the case of an apparatus wherein density fluctuations accompanying conveying error can be assumed to be small, using a mask segmenting method for a high-pass mode may be effective for obtaining a relatively high quality image.

With such a fourth embodiment, in the case where the number of times N of the multi-passes is less than the threshold M, the first image processing unit (104, 1045, 1046) may be selected by the selecting unit 103 in FIG. 5, 7, or 10, and the first processing mode (i.e., multivalued data segmenting method) is executed. On the other hand, in the case where the number of times N of the multi-passes is at or greater than the threshold M, the second image processing unit (106) may be selected by the selecting unit 103 in FIG. 5, 7, or 10, and the second processing mode (i.e., mask segmenting method) is executed.

Figure 23:
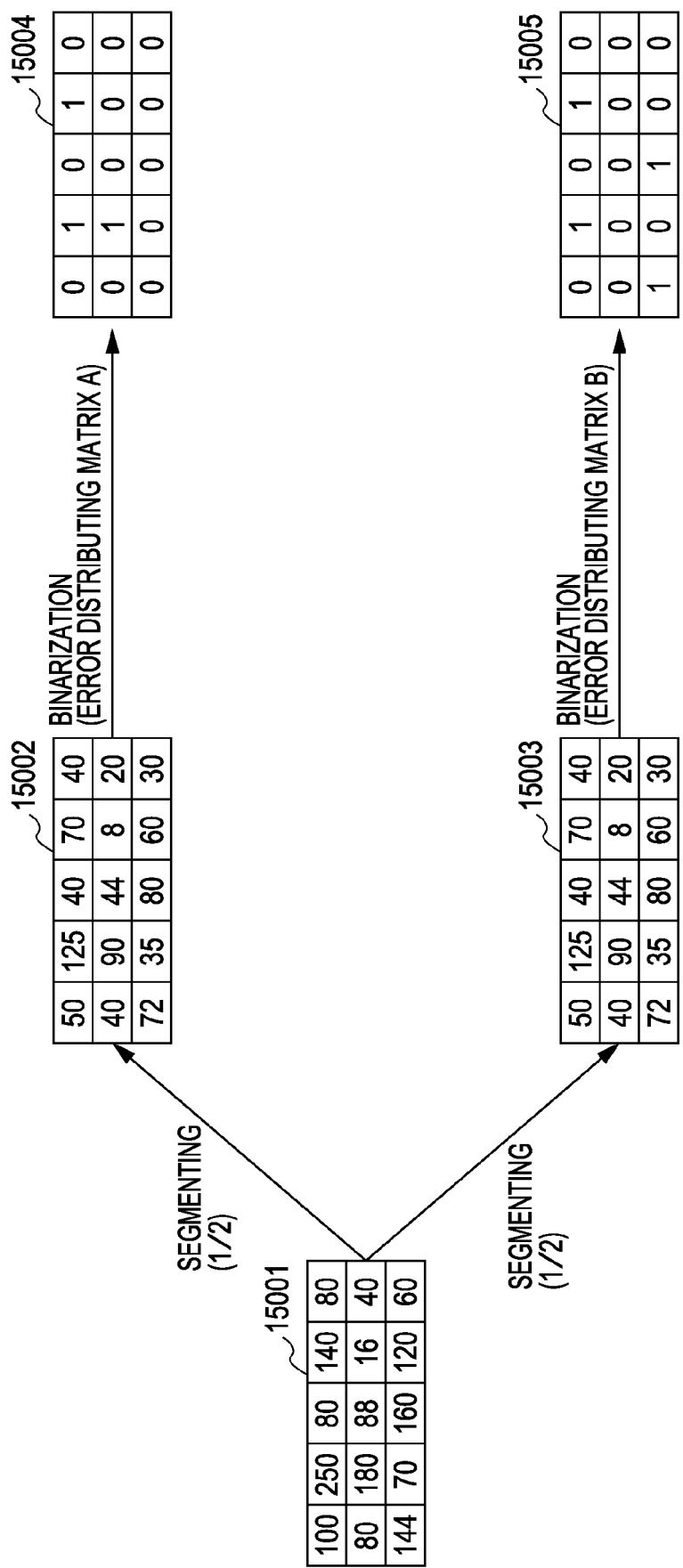
FIG. 23 is a diagram illustrating a specific example of the processing executed with the image segmenting leading processing unit according to the fourth embodiment.

A specific example of the first processing mode executed according to the fourth embodiment will be described with reference to FIG. 23. FIG. 23 illustrates a specific example of the first processing mode executed using the image segmenting leading processing unit 104 in FIG. 5 (first image processing unit), and will be described here with 2-pass multi-pass recording as an example. With the image segmenting unit 1041, the multivalued image data (15001) to be recorded on the unit area made up of 5 pixels×3 pixels is segmented in two. Thus, the multivalued image data (15001) is segmented into multivalued image data (15002) for the first pass and multivalued image data (15003) for the second pass. Next, with the binarizing processing unit 1042, binarizing processing is performed with an error diffusing method with respect to each of the multivalued image data (15002, 15003) segmented by the image segmenting unit 1041. Thus, the binary image data (15004) for the first pass and the binary image data (15005) for the second pass are generated. Specifically, the binary image data (15004) for the first pass is generated by performing error diffusing processing using the error distribution matrix A shown in the embodiment of FIG. 18A with respect to the multivalued data (15002) for the first pass. Also, the binary image data (15005) for the second pass is generated by performing error diffusing processing using the error distribution matrix B shown in the embodiment of FIG. 18B with respect to the multivalued data (15003) for the second pass. With the above mentioned processing, in the case that two planes (15004 and 15005) are overlaid, the locations where dots are overlaid one upon another (pixel wherein "1" exists in both planes) and the locations where dots are not overlaid one upon another (pixel wherein "1" exists in only one of the planes) can be arrayed in a row. Accordingly, even if shifting occurs in the recording position from fluctuations in conveying amount of the recording medium and so forth, density fluctuations of the image can be suppressed.

According to the above-described fourth embodiment, a processing mode with robustness is selected with a mode having relatively few passes, whereby image distortion resulting from density fluctuations from conveying error can be suppressed, and a high quality image can be recorded at a relatively high speed. Also, a processing mode which has a relatively small processing load, with the mode having a relatively high number of passes and improved granularity is selected, whereby a high quality image with relatively low granularity can be obtained without substantially decreasing throughput.

With the above-described embodiments, an inkjet method recording apparatus is used, but the present invention is not limited to such a recording apparatus. For example, any recording apparatus that allows a method to record images on a recording medium with recording heads during relative movement between recording heads and the recording medium to form dots on the recording medium can be favorably employed with the present invention.

Figure 24:
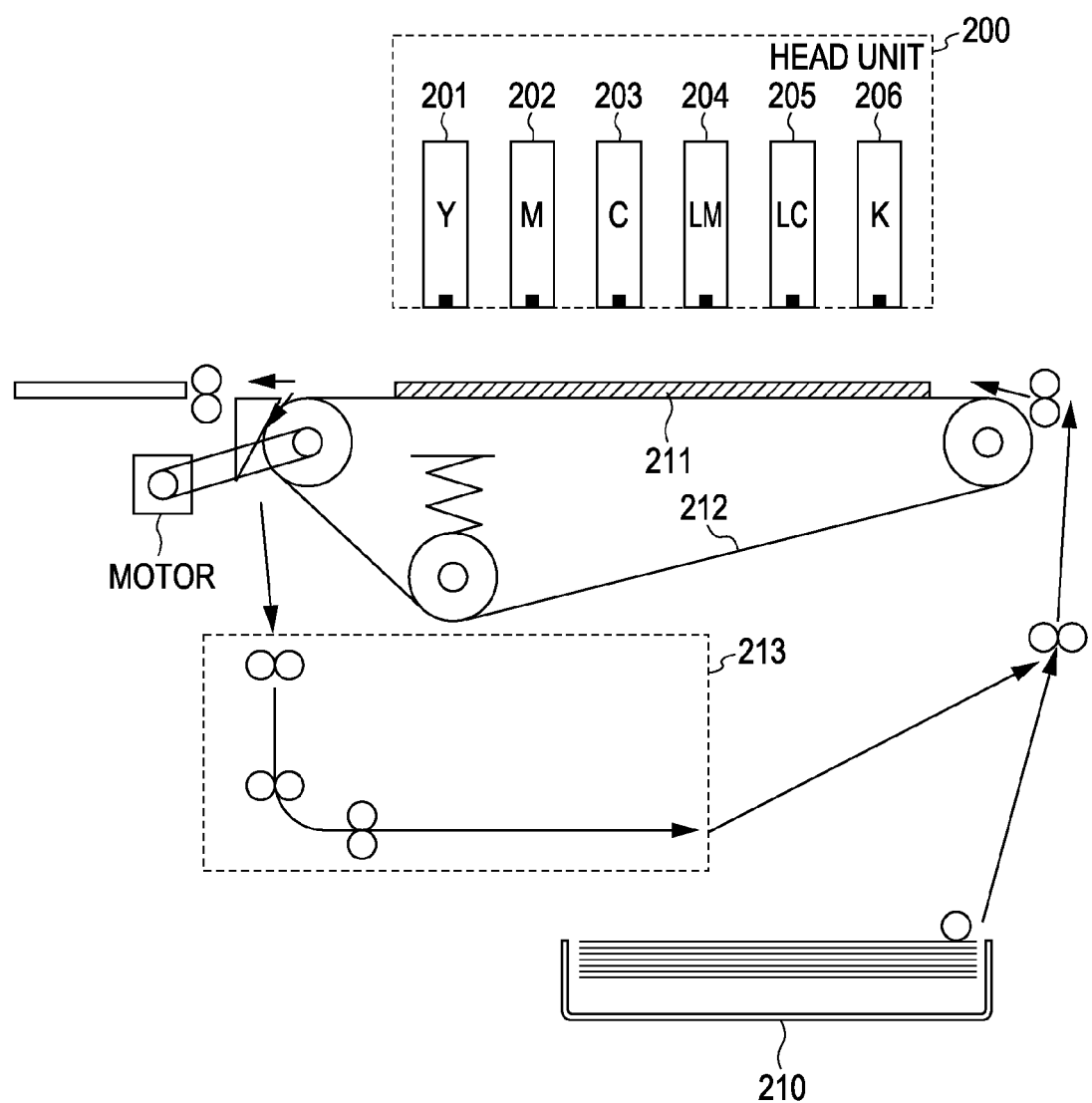
FIG. 24 is a schematic diagram illustrating an example of a full-line type inkjet recording apparatus.

With the above-described first through fourth embodiments, a case is described using a serial-type recording apparatus, but the present invention is not limited to a serial-type recording apparatus, and for example a full-line type recording apparatus shown in FIG. 24 may be employed. Note that in the case of using a full-line type recording apparatus, the multiple number of times of conveying operations of the recording medium as to the record heads equates to the multiple number of times of relative scanning (relative movement), and with the multiple number of times of relative scanning, the multi-pass recording may be executed.

FIG. 24 is a diagram illustrating an example of a full-line type recording apparatus to which the present invention can be applied. A recording medium 211 fed from a paper feed cassette 210 is mounted on a conveying belt 212, and the recording medium 211 is conveyed to the conveying belt 212 in a state of electrostatic adsorption. Ink is discharged from recording heads 201 through 206 as to the recording medium 211 which passes by the position facing a head unit 200 including the recording heads 201 through 206, and an image is formed on the recording medium 211. In order to perform multi-pass recording with such a full-line type recording apparatus, the recording medium may be conveyed multiple times to the position facing the recording heads. In the case of performing multi-pass recording, the recording medium on which a portion of the image to be recorded has been recorded is conveyed to the position facing the recording heads again, using a re-feed conveying mechanism 213. More specifically, the number N of multi-passes may be determined, and the recording medium may be conveyed to the position facing the recording heads N times, thereby executing multi-pass recording.

Also, with the above-described embodiment, with the first image processing unit (104, 1045, 1046) and second image processing unit (106), binarizing processing is used as quantizing processing, but the quantizing processing that can be used with the present invention is not limited to binarizing processing. For example, any processing can be used that is N-valued (N is an integer of 2 or greater) processing, such as 3-valued processing and 4-valued processing. Note that with the present Specification, the quantizing processing performed with the first image processing unit is called the first quantizing processing, and the quantizing processing performed with the second image processing unit is called the second quantizing process. Similarly, the segmenting processing performed with the first image processing unit is called the first segmenting processing, and the segmenting processing performed with the second image processing unit is called the second segmenting processing. Further, with the above-described first through fourth embodiments, the processing mode which the selecting unit 103 can select is limited to two, but an arrangement may also be made wherein three or more processing modes are selectable. For example, an arrangement may be made wherein, with the first embodiment, in addition to the processing mode that can be executed with the image segmenting leading processing unit 104 and the processing mode that can be executed with the binarizing leading processing unit 106, a processing mode that can be executed with the image segmenting leading processing unit 1046 of the third embodiment can also be selected. In other words, the selecting unit 103 should be configured such that at least two processing modes can be selected according to the number of multi-passes.

Also, the image processing apparatus that executes the image processing featured in the present invention is described above using a recording apparatus having image processing functions shown in FIGS. 5, 7, and 10 as an example, but the present invention should not be limited to such a configuration. For example, the image processing featured in the present invention may also be a configuration to be executed with a host apparatus, and the image data after binarizing may be input to the recording apparatus. Also, an arrangement may be made for a configuration wherein an image photographed with a digital camera or the like or a graphic image is input directly to the recording apparatus without transiting via a host apparatus or the like, and the entire image processing is executed at the recording apparatus. In the case of the former, the host apparatus, and in the case of the latter, the recording apparatus, may become the image processing apparatus according to the present invention. Note that the image processing featured in the present invention may indicate processing to select whether to perform processing in the order of segmenting and quantizing image data, or whether to perform processing in the order of quantizing and segmenting, in accordance with the number of times of relative movement of the recording heads as to the unit areas, as is clear from the above-described embodiments.

Aspects of the present invention may also be realized with a storage medium having program code with computer-executable instructions realizing the functions of the above-described image processing. In this case, a computer (or CPU or MPU) on the host apparatus or recording apparatus reads out and executes the above-mentioned computer-executable instructions, thereby executing the above-described image processing. Thus, a storage medium having computer-executable instructions for causing a computer to execute the above-described image processing, is also included as an aspect of the present invention.

Examples of a storage medium for supplying the program code may include, but are not limited to, a floppy disk, hard disk, optical discs such as CD-ROM and CD-R, magneto-optical disk, magnetic tape, non-volatile memory card, ROM, or the like.

Also by the computer executing the computer-executable instructions, the functions of the above-described embodiments are not only realized, but based on such instructions, the OS operating on the computer may perform a portion or all of the actual processing. Further, after the program code having the computer-executable instructions is written into a function expansion board inserted in the computer or into memory provided to a function expansion unit connected to the computer, based on the instructions of the program code thereof, the CPU or the like may perform a portion or all of the actual processing.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-329340 filed Dec. 20, 2007, which is hereby incorporated by reference herein in its entirety.

What is claimed is:

1. An image processing apparatus configured to process multivalued image data corresponding to a unit area of a recording medium for forming an image of one raster on the unit area by recording with relative movements of a recording head and the unit area, the image processing apparatus comprising:
    an acquiring unit for acquiring a number of the relative movements; and
    a selecting unit configured to select one processing mode from a plurality of processing modes including
        a first processing mode for dividing the multivalued image data into a plurality of multivalued data corresponding to the relative movements, and then quantizing each of the plurality of multivalued data, and
        a second processing mode for quantizing the multivalued image data into quantization data, and then dividing the quantization data into a plurality of quantization data corresponding to the relative movements, based on the number of the relative movements to the unit area acquired by the acquiring unit.

2. The image processing apparatus according to claim 1, wherein the selecting unit selects the first processing mode when the number of the relative movements is a first number, and the selecting unit selects the second processing mode when the number of the relative movements is a second number that is less than the first number.

3. The image processing apparatus according to claim 1, wherein the selecting unit selects the second processing mode when the number of the relative movements is a first number, and the selecting unit selects the first processing mode when the number of the relative movements is a second number that is less than the first number.

4. The image processing apparatus according to claim 1, further comprising:
    a first image processing unit configured to execute the first processing mode, the first image processing unit including
        a first dividing unit configured to perform dividing processing for dividing the multivalued image data into the plurality of multivalued data corresponding to the number of the relative movements, and
        a first quantizing unit configured to perform quantizing processing for quantizing each of the plurality of multivalued data that has been divided with the first dividing unit; and
    a second image processing unit configured to execute the second processing mode, the second image processing unit including
        a second quantizing unit configured to perform quantizing processing for quantizing the multivalued image data into quantization data, and
        a second dividing unit configured to perform dividing processing for dividing the quantization data that has been quantized with the second quantizing unit into the plurality of divided quantization data corresponding to the number of the relative movements.

5. The image processing apparatus according to claim 4, wherein the first quantizing unit performs the quantizing processing on the divided multivalued data corresponding to a subsequent relative movement of the relative movements, based on results of the quantizing processing on the divided multivalued data corresponding to a preceding relative movement of the relative movements.

6. The image processing apparatus according to claim 4, wherein at least one of the first quantizing unit and the second quantizing unit performs binarizing processing with an error diffusing method in the quantizing processing.

7. The image processing apparatus according to claim 4, wherein at least one of the first quantizing unit and the second quantizing unit performs binarizing processing with a dither matrix method in the quantizing processing.

8. The image processing apparatus according to claim 1, wherein the relative movement is an operation to relatively move the recording head with respect to the recording medium, or an operation to relatively move the recording medium with respect to the recording head.

9. An image forming apparatus, comprising:
    the image processing apparatus according to claim 1; and
    a driving unit configured to drive the recording head based on image data processed with the image processing apparatus.

10. An image processing apparatus for processing multivalued image data corresponding to a unit area of a recording medium for forming an image of one raster on the unit area by recording with relative movements of a recording head and the unit area, the image processing apparatus comprising:
    an acquiring unit for acquiring a number of the relative movements;
    a first image processing unit configured to divide the multivalued image data into N pieces of multivalued data corresponding to N times of the relative movements and then binarize each of the N pieces of multivalued data, where N is an integer of 2 or greater;
    a second image processing unit configured to binarize the multivalued image data to generate binary data and then divide the binary data into M pieces of binary data corresponding to M times of the relative movements, where M is an integer of 2 or greater and is different from N; and
    a selecting unit configured to select the first image processing unit when the number of the relative movements acquired by the acquiring unit is N, and to select the second image processing unit when the number of the relative movements acquired by the acquiring unit is M.

11. An image processing method for processing multivalued image data corresponding to a unit area of a recording medium for forming an image of one raster on the unit area by recording with relative movements of a recording head and the unit area, the image processing method comprising:
- acquiring a number of the relative movements;
- selecting one processing mode from a plurality of processing modes including
  - a first processing mode for dividing the multivalued image data into a plurality of multivalued data corresponding to the relative movements, and then quantizing each of the plurality of multivalued data, and
  - a second processing mode for quantizing the multivalued image data into quantization data, and then dividing the quantization data into a plurality of quantization data corresponding to the relative movements; and
- executing the selected one processing mode,
- based on the number of the relative movements to the unit area acquired by the acquiring unit.

12. The image processing method according to claim 11, wherein the first processing mode is selected when the number of the relative movements is a first number, and the second processing mode is selected when the number of the relative movements is a second number that is less than the first number.

13. The image processing method according to claim 11, wherein the second processing mode is selected when the number of the relative movements is a first number, and the first processing mode is selected when the number of the relative movements is a second number that is less than the first number.

14. A non-transitory computer readable medium containing computer-executable instructions for causing a computer to execute an image processing method for processing multivalued image data corresponding to a unit area of a recording medium for perform an image of one raster in the unit area by recording with relative movements of a recording head and the unit area, the computer readable medium comprising:
- computer-executable instructions for
- acquiring a number of the relative movements;
- selecting one processing mode from a plurality of processing modes including
  - a first processing mode for dividing the multivalued image data into a plurality of multivalued data corresponding to the relative movements, and then quantizing each of the plurality of multivalued data, and
  - a second processing mode for quantizing the multivalued image data into quantization data, and then dividing the quantization data into a plurality of quantization data corresponding to the relative movements; and
- executing the selected one processing mode, based on the number of the relative movements to the unit area acquired by the acquiring unit.

15. The non-transitory computer readable medium according to claim 14, wherein the first processing mode is selected when the number of the relative movements is a first number, and the second processing mode is selected when the number of the relative movements is a second number that is less than the first number.

16. The non-transitory computer readable medium according to claim 14, wherein the second processing mode is selected when the number of the relative movements is a first number, and the first processing mode is selected when the number of the relative movements is a second number that is less than the first number.

17. An image processing apparatus configured to process multivalued image data corresponding to a unit area of a recording medium for forming an image of one raster on the unit area by recording with relative movements of a recording head and the unit area, the image processing apparatus comprising:
- an acquiring unit configured to acquire information representing a number of the relative movements;
- a first dividing unit configured to divide the multivalued image data into a plurality of multivalued data corresponding to the relative movements;
- a first quantizing unit configured to quantize each of the plurality of multivalued data divided by the first dividing unit;
- a second quantizing unit configured to quantize the multivalued image data into quantization data;
- a second dividing unit configured to divide the quantization data quantized by the second quantizing unit into a plurality of quantization data corresponding to the relative movements; and
- a selecting unit configured to select whether the multivalued image data is processed using the first dividing unit and the first quantizing unit or using the second quantizing unit and the second dividing unit, based on the number of the relative movements to the unit area represented by the information acquired by the acquiring unit.

18. The image processing apparatus according to claim 17, wherein the selecting unit selects that the multivalued image data is processed using the first dividing unit and the first quantizing unit, when the number of the relative movements is a first number, and the selecting unit selects that the multivalued image data is processed using the second quantizing unit and the second dividing unit, when the number of the relative movements is a second number that is less than the first number.

19. The image processing apparatus according to claim 17, wherein the selecting unit selects that the multivalued image data is processed using the second quantizing unit and the second dividing unit, when the number of the relative movements is a first number, and the selecting unit selects that the multivalued image data is processed using the first dividing unit and the first quantizing unit, when the number of the relative movements is a second number that is less than the first number.

20. The image processing apparatus according to claim 17, wherein at least one of the first quantizing unit and the second quantizing unit performs binarizing processing with a dither matrix method in the quantizing processing.

* * * * *